United States Patent
Bosser et al.

(10) Patent No.: US 11,034,063 B2
(45) Date of Patent: Jun. 15, 2021

(54) RETAINING DEVICE INCLUDING REINFORCED RETAINING ELEMENTS

(71) Applicant: APLIX, Le Cellier (FR)

(72) Inventors: Damien Bosser, Le Cellier (FR); Anthony Mahe, Le Cellier (FR)

(73) Assignee: APLIX, Le Cellier (FR)

( * ) Notice: Subject to any disclaimer, the term of this patent is extended or adjusted under 35 U.S.C. 154(b) by 0 days.

(21) Appl. No.: 16/096,894

(22) PCT Filed: Apr. 28, 2017

(86) PCT No.: PCT/FR2017/051006
§ 371 (c)(1),
(2) Date: Oct. 26, 2018

(87) PCT Pub. No.: WO2017/187096
PCT Pub. Date: Nov. 2, 2017

(65) Prior Publication Data
US 2019/0134862 A1    May 9, 2019

(30) Foreign Application Priority Data

Apr. 29, 2016  (FR) ........................................ 1653866
Apr. 29, 2016  (FR) ........................................ 1653870
(Continued)

(51) Int. Cl.
*B29C 43/22*    (2006.01)
*A44B 18/00*    (2006.01)
(Continued)

(52) U.S. Cl.
CPC ........ *B29C 43/222* (2013.01); *A44B 18/0049* (2013.01); *A44B 18/0065* (2013.01);
(Continued)

(58) Field of Classification Search
CPC ............ A44B 18/0049; A44B 18/0065; A44B 18/0069; B29C 2043/461;
(Continued)

(56) References Cited

U.S. PATENT DOCUMENTS 3,708,833 A   1/1973  Ribich
5,212,853 A   5/1993  Kaneko
(Continued)

FOREIGN PATENT DOCUMENTS

DE   10 2010 007 493 A1   8/2011
EP         0 811 332 A2   12/1997
(Continued)

OTHER PUBLICATIONS

International Search Report dated Jul. 26, 2017, in International Application No. PCT/FR2017/051015 (7 pages).
(Continued)

*Primary Examiner* — Robert Sandy
*Assistant Examiner* — David M Upchurch
(74) *Attorney, Agent, or Firm* — Bookoff McAndrews, PLLC

(57) ABSTRACT

A retaining device includes a base (51) extending in a longitudinal direction and presenting a top face (511) and a bottom face (512); and a plurality of retaining elements extending from the top face (511) of the base (51), each of the retaining elements being formed by a stem (52) surmounted by a head (53), the stem (52) having a bottom end (521) connected to the base (51), and a top end (522) opposite from the bottom end (521), the head (53) surmounting the top end (522) of the stem (52), and having a bottom face facing towards the base and a top face opposite from the bottom face.

20 Claims, 10 Drawing Sheets

(30) Foreign Application Priority Data

| Apr. 29, 2016 | (FR) | 1653872 |
|---|---|---|
| Apr. 29, 2016 | (FR) | 1653873 |
| Apr. 29, 2016 | (FR) | 1653888 |
| Apr. 29, 2016 | (FR) | 1653894 |
| Apr. 29, 2016 | (FR) | 1653897 |

(51) Int. Cl.

| B29C 33/10 | (2006.01) |
|---|---|
| B29C 41/28 | (2006.01) |
| B29C 43/46 | (2006.01) |
| B32B 3/06 | (2006.01) |
| B32B 5/02 | (2006.01) |
| B32B 5/26 | (2006.01) |
| B32B 7/04 | (2019.01) |
| B32B 25/08 | (2006.01) |
| B32B 25/10 | (2006.01) |
| B32B 25/14 | (2006.01) |
| B32B 25/16 | (2006.01) |
| B32B 27/08 | (2006.01) |
| B32B 27/12 | (2006.01) |
| B32B 27/28 | (2006.01) |
| B29C 43/50 | (2006.01) |
| B32B 27/30 | (2006.01) |
| B32B 27/32 | (2006.01) |
| B32B 27/34 | (2006.01) |
| B32B 37/15 | (2006.01) |
| B32B 3/20 | (2006.01) |
| B29C 48/00 | (2019.01) |
| B29C 48/19 | (2019.01) |
| B29C 43/52 | (2006.01) |
| B29C 41/38 | (2006.01) |
| B29C 41/44 | (2006.01) |
| B29C 41/32 | (2006.01) |
| B32B 3/30 | (2006.01) |
| B32B 7/12 | (2006.01) |
| B29C 41/30 | (2006.01) |
| B29C 43/28 | (2006.01) |
| B29C 43/48 | (2006.01) |
| B32B 37/00 | (2006.01) |
| B29L 31/00 | (2006.01) |
| B32B 37/20 | (2006.01) |
| B29K 101/12 | (2006.01) |
| B29K 23/00 | (2006.01) |
| B32B 27/36 | (2006.01) |

(52) U.S. Cl.
CPC .......... *A44B 18/0069* (2013.01); *B29C 33/10* (2013.01); *B29C 41/28* (2013.01); *B29C 41/30* (2013.01); *B29C 41/32* (2013.01); *B29C 41/38* (2013.01); *B29C 41/44* (2013.01); *B29C 43/28* (2013.01); *B29C 43/46* (2013.01); *B29C 43/48* (2013.01); *B29C 43/50* (2013.01); *B29C 43/52* (2013.01); *B29C 48/001* (2019.02); *B29C 48/002* (2019.02); *B29C 48/19* (2019.02); *B32B 3/06* (2013.01); *B32B 3/20* (2013.01); *B32B 3/30* (2013.01); *B32B 5/022* (2013.01); *B32B 5/024* (2013.01); *B32B 5/026* (2013.01); *B32B 5/26* (2013.01); *B32B 7/04* (2013.01); *B32B 7/12* (2013.01); *B32B 25/08* (2013.01); *B32B 25/10* (2013.01); *B32B 25/14* (2013.01); *B32B 25/16* (2013.01); *B32B 27/08* (2013.01); *B32B 27/12* (2013.01); *B32B 27/28* (2013.01); *B32B 27/302* (2013.01); *B32B 27/306* (2013.01); *B32B 27/32* (2013.01); *B32B 27/327* (2013.01); *B32B 27/34* (2013.01); *B32B 37/15* (2013.01); *B29C 2043/461* (2013.01); *B29C 2043/486* (2013.01); *B29C 2791/001* (2013.01); *B29K 2023/12* (2013.01); *B29K 2101/12* (2013.01); *B29K 2713/00* (2013.01); *B29L 2031/729* (2013.01); *B32B 27/36* (2013.01); *B32B 37/0053* (2013.01); *B32B 37/20* (2013.01); *B32B 2037/0092* (2013.01); *B32B 2250/03* (2013.01); *B32B 2250/40* (2013.01); *B32B 2262/023* (2013.01); *B32B 2262/0215* (2013.01); *B32B 2262/0223* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2262/04* (2013.01); *B32B 2262/062* (2013.01); *B32B 2262/065* (2013.01); *B32B 2307/718* (2013.01); *B32B 2307/732* (2013.01); *B32B 2309/02* (2013.01); *B32B 2367/00* (2013.01); *B32B 2435/00* (2013.01)

(58) Field of Classification Search
CPC ........ B29C 2043/486; B29C 2791/001; B29C 33/10; B29C 41/28; B29C 41/32; B29C 41/38; B29C 41/44; B29C 43/222; B29C 43/46; B29C 43/50; B29C 48/001; B29C 48/002; B29C 48/19; B29K 2023/12; B29K 2101/12; B29L 2031/729; B32B 2037/0092; B32B 2250/03; B32B 2250/40; B32B 2262/0215; B32B 2262/0223; B32B 2262/023; B32B 2262/0253; B32B 2262/0261; B32B 2262/0276; B32B 2262/0284; B32B 2262/0292; B32B 2262/04; B32B 2262/062; B32B 2262/065; B32B 2307/718; B32B 2307/732; B32B 2309/02; B32B 2367/00; B32B 2435/00; B32B 25/08; B32B 25/10; B32B 25/14; B32B 25/16; B32B 27/08; B32B 27/12; B32B 27/28; B32B 27/302; B32B 27/306; B32B 27/327; B32B 27/34; B32B 27/36; B32B 37/0053; B32B 37/15; B32B 37/20; B32B 3/06; B32B 3/20; B32B 3/30; B32B 5/022; B32B 5/024; B32B 5/026; B32B 5/26; B32B 7/04; B32B 7/12
See application file for complete search history.

(56) References Cited

U.S. PATENT DOCUMENTS

| 5,441,687 | A | | 8/1995 | Murasaki et al. | |
|---|---|---|---|---|---|
| 5,518,795 | A | | 5/1996 | Kennedy et al. | |
| 5,845,375 | A | * | 12/1998 | Miller | A41D 13/1161 |
| | | | | | 24/452 |
| 6,206,679 | B1 | | 3/2001 | Provost et al. | |
| 6,432,339 | B1 | * | 8/2002 | Jens | A44B 18/0049 |
| | | | | | 264/167 |
| 7,350,276 | B2 | * | 4/2008 | Minato | A44B 18/0061 |
| | | | | | 24/452 |
| 8,819,902 | B2 | * | 9/2014 | Tuma | A44B 18/0049 |
| | | | | | 24/442 |
| 2001/0001283 | A1 | | 5/2001 | Kennedy et al. | |
| 2002/0116799 | A1 | | 8/2002 | Martin et al. | |
| 2002/0190418 | A1 | | 12/2002 | Jens et al. | |
| 2003/0041957 | A1 | | 3/2003 | Harvey et al. | |
| 2004/0134045 | A1 | * | 7/2004 | Poulakis | A44B 18/0049 |
| | | | | | 24/442 |
| 2004/0229739 | A1 | | 11/2004 | Gorman et al. | |

(56) References Cited

U.S. PATENT DOCUMENTS

| | | | |
|---|---|---|---|
| 2005/0060849 A1* | 3/2005 | Vanbenschoten | A61F 13/625 24/451 |
| 2006/0247567 A1 | 11/2006 | Baldauf et al. | |
| 2009/0064469 A1 | 3/2009 | Dowd | |
| 2010/0101056 A1 | 4/2010 | Cheng | |
| 2010/0239699 A1 | 9/2010 | Banker et al. | |
| 2013/0280474 A1 | 10/2013 | Medina et al. | |
| 2014/0103567 A1 | 4/2014 | Collins et al. | |
| 2014/0237779 A1* | 8/2014 | Gallant | A44B 18/0049 24/449 |
| 2015/0010732 A1 | 1/2015 | Tuma | |
| 2015/0272790 A1* | 10/2015 | Fujisaki | A44B 18/0065 604/391 |

FOREIGN PATENT DOCUMENTS

| | | |
|---|---|---|
| EP | 1 783 257 A1 | 5/2007 |
| EP | 2 850 961 A1 | 3/2015 |
| FR | 2 129 663 A5 | 10/1972 |
| JP | 836-009983 B | 7/1961 |
| JP | S51-002512 B | 1/1976 |
| JP | H09-308509 A | 12/1997 |
| JP | H09-322811 A | 12/1997 |
| JP | 2000-236919 A | 9/2000 |
| JP | 2005-185458 A | 7/2005 |
| JP | 2010-110537 A | 5/2010 |
| JP | 2015-504736 A | 2/2015 |
| KR | 10-2007-01168 78 | 12/2007 |
| RU | 2151059 C1 | 6/2000 |
| RU | 2193968 C2 | 12/2002 |
| RU | 2534245 C2 | 11/2014 |
| WO | 98/15201 A1 | 4/1998 |
| WO | 00/50208 A2 | 8/2000 |
| WO | 01/67911 A2 | 9/2001 |
| WO | 02/091869 A1 | 11/2002 |
| WO | 2005/090046 A1 | 9/2005 |
| WO | 2010/109087 A1 | 9/2010 |
| WO | 2010/130886 A1 | 11/2010 |
| WO | 2011/097436 A1 | 8/2011 |
| WO | 2013/156368 A1 | 10/2013 |
| WO | 2014/064843 A1 | 5/2014 |

OTHER PUBLICATIONS

International Search Report dated Jul. 27, 2017, in International Application No. PCT/FR2017/051011 (9 pages).
International Search Report dated Jul. 27, 2017, in International Application No. PCT/FR2017/051014 (7 pages).
International Search Report dated Sep. 7, 2017, in International Application No. PCT/FR2017/051006 (7 pages).
International Search Report dated Sep. 7, 2017, in International Application No. PCT/FR2017/051010 (7 pages).
International Search Report dated Jul. 25, 2017, in International Application No. PCT/FR2017/051012 (7 pages).
International Search Report dated Jul. 31, 2017, in International Application No. PCT/FR2017/051016 (6 pages).
Office Action in JP Application No. 2018-556480, dated Mar. 23, 2021 (9 pages).
Office Action in JP Application No. 2018-556274, dated Mar. 11, 2021 (7 pages).
Office Action in JP Application No. 2018-556500, dated Mar. 23, 2021 (14 pages).
Office Action in KR Application No. 10-2018-7034590, dated Feb. 23, 2021 (12 pages).

* cited by examiner

RETAINING DEVICE INCLUDING REINFORCED RETAINING ELEMENTS

CROSS-REFERENCE TO RELATED APPLICATIONS

This application is the U.S. national phase entry under 35 U.S.C. § 371 of International Application No. PCT/FR2017/051006, filed on Apr. 28, 2017, which claims priority to French Patent Application No. 1653866, filed on Apr. 29, 2016; French Patent Application No. 1653870, filed on Apr. 29, 2016; French Patent Application No. 1653872, filed on Apr. 29, 2016; French Patent Application No. 1653873, filed on Apr. 29, 2016; French Patent Application No. 1653888, filed on Apr. 29, 2016; French Patent Application No. 1653894, filed on Apr. 29, 2016; and French Patent Application No. 1653897, filed on Apr. 29, 2016; the entireties of each of which are herein incorporated by reference.

GENERAL TECHNICAL FIELD

The present disclosure relates to the field of closure systems, and more particularly it relates to closure systems with hooks and to associated methods and apparatuses for fabricating them.

STATE OF THE PRIOR ART

Closure systems with hooks are well known and are used in numerous application fields, thus leading to hooks being made in a multiplicity of shapes and more generally to retaining elements being made in a multiplicity of shapes for co-operating mutually or for co-operating with complementary elements such as loops.

A problem that frequently occurs with such products relates to the applied retention force, in particular given the necessarily small size of the hooks and the associated fabrication constraints.

Specifically, making hooks that present high strength leads naturally to the hooks being overdimensioned, which is detrimental to the softness of the system and also to the user's sensation, which is very penalizing in certain fields, in particular in the field of hygiene, and also leads to an increased consumption of material, which is penalizing in terms of costs, and also penalizing in fabrication terms in so far as making parts that are bulky leads to increased cooling times for the material, thereby increasing the length of time that production lines are occupied.

The present disclosure thus seeks to address these various problems.

SUMMARY OF THE DISCLOSURE

First Aspect of the Disclosure

In a first aspect, the present disclosure relates to a retaining device comprising:
- a base extending in a longitudinal direction and presenting a top face and a bottom face;
- a plurality of retaining elements extending from the top face of the base, each of the retaining elements being formed by a stem surmounted by a head, the stem having a bottom end connected to the base, and a top end opposite from the bottom end, the head surmounting the top end of the stem, and having a bottom face facing towards the base and a top face opposite from the bottom face;

the device being characterized in that
- the base presents a thickness lying in the range 10 micrometers (µm) to 700 µm, where the thickness is the distance between the top face and the bottom face; and
- the top face of the head of each retaining element includes a rib.

In an example, the head of each retaining element includes a catch portion extending radially relative to the top end of the stem, said rib extending at least in part over the catch portion.

In an example, the head of each retaining element includes two catch portions extending radially relative to the top end of the stem, each of said catch portions including a rib, said catch portions extending on either side of the stem.

The head may then include a rib extending continuously between the two catch portions.

In an example, the head further includes a transverse rib extending between two opposite ends of the head on either side of an axis extending in the longitudinal direction and passing via the stem and/or the head, typically via the middle of the stem and/or of the head, the transverse rib extending over the top end of the stem.

In an example, the at least one catch portion includes a downwardly sloping free end.

In an example, the top face of the head of each retaining element as two distinct rims extending at least in part over the same catch portion.

In an example, for each retaining element, each of the ribs extends over a fraction only of the periphery of the head, in particular the combined length of the ribs of a retaining element under consideration lies in the range 5% to 95% of the length of the periphery of the head of the retaining element under consideration, more particularly in the range 30% to 85% of the length of the periphery of the head of the retaining element under consideration.

In an example, said base has two edges in the longitudinal direction, and wherein each of said edges presents highs and lows, the maximum offset between the highs and the lows along a direction transverse to the longitudinal direction being less than 1 millimeter (mm) over a length in the longitudinal direction that corresponds to three consecutive highs.

In an example, the width of the base lies in the range 1 mm to 500 mm, more particularly in the range 3 mm to 100 mm.

In an example, the retaining elements have a height lying in the range 5 µm to 5000 µm, or indeed in the range 5 µm to 2000 µm, or more particularly in the range 20 µm to 800 µm, with height being measured in a direction perpendicular to the top face of the base.

In an example, the stem of each retaining element presents symmetry of rotation about an axis perpendicular to the top face of the base.

In an example, each rib of the head extends in a direction that is substantially transverse (i.e. to within ±30°) to said longitudinal direction of the base.

In an example, the retaining elements present a shape that is asymmetrical relative to a plane that is transverse to the longitudinal direction of the base.

In an example, each retaining element presents symmetry relative to a plane extending in a longitudinal direction of the base and containing the axis of the stem of the retaining element. This rib is arranged in such a manner as to reinforce of the head of the hook, in particular its catch portions, in order to facilitate inserting and/or passing fibers or filaments under the head so as to enable them to be retained. The height of the rib (measured along a direction perpendicular to the plane of the base) lies typically in the range 0.005 mm to 0.1 mm, preferably in the range 0.01 mm to 0.08 mm. The term "rib" designates a longitudinal portion that extends, in its height direction, from the surface of the head substantially away from the base. This represents a length (measured substantially along the longitudinal direction) that is greater than its width (measured substantially along a transverse direction). More particularly, the ratio of the width over the length of the rib is strictly less than 1. In other words, the rib forms a projection from the top surface of the hook in such a manner that the top surface of the hook is not flat.

In an example, each catch portion extends in a direction that is substantially perpendicular to the longitudinal direction of the base.

In an example, each rib, seen from above the hook, presents a V-shape in which the angle between the two branches of the upside down V-shape (or U-shape or C-shape) lies in the range 90° to 180°, more particularly in the range 110° to 170°, or more precisely in the range 140° to 150°. The tip of the upside down V-shape is typically situated towards the front of the hook in the longitudinal direction.

In an example, the length of at least one rib in a direction transverse to the longitudinal direction of the base is greater than the diameter of the stem in a direction perpendicular to the longitudinal direction of the base.

Second Aspect of the Disclosure

In a second aspect, the present disclosure relates to a retaining device with hooks comprising
 a base extending in a longitudinal direction and presenting a top face and a bottom face;
 a plurality of retaining elements extending from the top face of the base, each retaining element being formed by a stem and a head;
 the device being characterized in that:
 the base presents a thickness lying in the range 10 µm to 700 µm, where the thickness is the distance between the top face and the bottom face; and
 the base has two edges in the longitudinal direction, each of said edges presents highs and lows, wherein the maximum offset between the highs and the lows along a direction transverse to the longitudinal direction is less than 1.0 mm over a length in the longitudinal direction that corresponds to three consecutive highs.

In an example, in section view on a direction transverse to the longitudinal direction, said edges present portions of rounded shape.

In an example, the maximum offset between the highs and the lows in a direction transverse to the longitudinal direction and over a length in the longitudinal direction corresponding to three successive highs, said maximum offset lies in the range 0.001 mm to 1.0 mm, more particularly the range 0.001 mm to 0.5 mm, still more particularly in the range 0.001 mm to 0.1 mm.

In an example, the three consecutive highs are over a distance that is less than the distance corresponding to 15 times the hook pitch, preferably less than a distance of 25.0 mm.

In an example, the width of the base measured in a direction transverse to the longitudinal direction lies in the range 1 mm to 500 mm, more particularly in the range 3 mm to 100 mm.

In an example, the retaining elements have a height lying in the range 5 µm to 5000 µm, or indeed in the range 5 µm to 2000 µm, or more particularly in the range 20 µm to 800 µm, or still more particularly in the range 100 µm to 500 µm, with height being measured in a direction perpendicular to the top face of the base.

In an example, the stem of each retaining element presents symmetry of rotation about an axis perpendicular to the top face of the base.

In an example, each of the retaining elements is formed by a stem surmounted by a head, the stem having a bottom end connected to the base, and a top end opposite from the bottom end, the head surmounting the top end of the stem, and having a bottom face facing towards the base and a top face opposite from the bottom face, and wherein the top face of the head of each retaining element includes a rib.

In an example, the retaining elements present a shape that is asymmetrical relative to a direction that is transverse to the longitudinal direction of the base.

In an example, each retaining element presents symmetry relative to a plane extending in a longitudinal direction of the base and containing the axis of the stem of the retaining element. The base of the tape is thus free from any extra thickness extending continuously along its edges, and typically presents a thickness that is substantially constant from one edge to the other. A thickness is said to be "substantially" constant when that thickness presents variation of less than 15%. More generally, it can be understood that the base of the tape may be free from any non-functional extra thickness (or from any extra thickness having the sole function of improving the regularity of the margins of the tape), which is advantageous in production terms in so far as extra thickness leads to overconsumption of material and increases the length of time the molds are occupied.

In an example, the device further comprises a layer of nonwoven material secured to the bottom face of the base and/or to the top face of the base, and wherein fractions of fibers and/or filaments of the layer of nonwoven material are encapsulated in the base.

In an example, the device further comprises a plastics film or an elastic film or a composite film secured to the bottom face of the base, the surface area of the film in contact with the bottom face of the base being greater than the projection of the surface area of the film onto a plane defined by the bottom face of the base.

Third Aspect of the Disclosure

In a third aspect, the present disclosure relates to a method of assembling an assembly comprising a tape of retaining elements and a substrate, said method comprising the following steps:
 a step of forming a tape of retaining elements by dispensing a molding material into a molding device, so as to form a tape of retaining elements comprising a base presenting a bottom face and a top face, the top face of the base being provided with retaining elements; and
 a step of applying a substrate against the bottom face of the base prior to said bottom face of the base solidifying in such a manner as to cause the substrate to penetrate at least in part beyond a plane defined by the bottom face of the base of the tape.

In an example, during the step of applying a substrate against the bottom face of the base, the bottom face of the base, upstream from the application step, is at a temperature that is lower than its melting temperature, or more particularly lower than the heat deflection temperature of the material forming the base, and the temperature of the base results solely from the step of forming the tape.

In an example, during the step of applying the substrate against the bottom face of the base, the base is at a surface temperature lying between the melting temperature of the material constituting the base and the Vicat B softening temperature of the material constituting the base minus 30° C., more particularly between the melting temperature of the material constituting the base and the Vicat A softening temperature of the material constituting the base, or indeed in the range 75° C. to 150° C., in particular substantially equal to 105° C. for a base made of polypropylene.

In an example, during the step of applying the substrate against the bottom face of the base, pressure is applied by means of a roller.

In an example, the method includes a subsequent step of unmolding the assembly formed by the tape of retaining elements and the substrate.

In an example, the substrate is a layer of nonwoven material, and wherein portions of fibers and/or filaments of the layer of nonwoven material are encapsulated in the base.

The step of applying the substrate against the bottom face of the base prior to solidification of said bottom face of the base is then typically performed in such a manner as to cause portions of fibers and/or filaments of the nonwoven layer to penetrate into the base, at least in part.

In a variant, the substrate is a plastics film, an elastic film, or a composite film.

The step of applying the substrate against the bottom face of the base prior to solidification of said bottom face of the base is then typically performed in such a manner that the surface area of the substrate in contact with the bottom face of the base is greater than the surface area of the substrate projected onto the bottom face of the base, in particular once the base has cooled.

In an example, following the step of applying the substrate, the base and the hooks are cooled in such a manner as to cause the material forming the base to shrink, thereby causing local deformation of the bottom face of the base, this deformation giving rise to deformation of the top face of the substrate secured thereto.

In another variant, the substrate is a set of thermally-consolidated fibers and/or filaments.

In an example, the substrate is applied in non-uniform manner against the bottom face of the base so as to obtain non-uniform bonding between the base and the substrate.

In an example, the substrate is applied in uniform manner against the bottom face of the base so as to obtain substantially uniform bonding between the base and the substrate.

In an example, the step of forming the tape of retaining elements makes elements in relief projecting from and/or recessed in the bottom face of the base and distinct from the retaining elements, and wherein the step of applying the substrate against the bottom face of the base provides bonding between the substrate and the base via said elements in relief.

In an example, during the step of forming the tape of retaining elements;
   a molding strip is provided that presents an inside face and an outside face, and that has a plurality of cavities, each cavity defining a stem extending from the outside face towards the inside face and including an end forming a head that extends from the stem towards the inside face of the molding strip;
   the molding strip is positioned on rotary drive means (e.g. comprising at least two rollers), the inside face of the molding strip being arranged to bear against the drive means; and
   molding material is dispensed against the outside face of the molding strip via material dispenser means arranged facing the molding strip in such a manner as to define a gap between the material dispenser means and the molding strip, the molding material being dispensed in such a manner as to fill said gap and the cavities with molding material so as to form a tape comprising a base of thickness that is defined by the gap, and first preforms projecting from said base, each comprising a stem and a head, the first preforms being formed by the plastics material in the cavities of the molding strip.

In an example, during unmolding, the strip and the first preforms are unmolded in such a manner as to deform the first preforms plastically so as to obtain second preforms of shape that is different from the first preforms.

It is then possible, after the unmolding step, to perform a forming step during which the unmolded tape is inserted into a forming device so as to modify the shape of the heads of the second preforms by forming.

The step of dispensing the molding material is typically performed in such a manner as to form a tape extending in a longitudinal direction and comprising a base presenting two edges in the longitudinal direction, each of the edges presenting highs and lows, wherein the maximum offset between the highs and the lows is less than 1.0 mm over a length in the longitudinal direction corresponding to three consecutive highs, and wherein the step of applying the substrate against the bottom face of the base conserves this maximum offset in a direction transverse to the longitudinal direction between the highs and lows at less than 1 mm over a length in the longitudinal direction corresponding to three consecutive highs.

This third aspect also provides apparatus for performing a method as described above;
   a molding device and molding material dispenser means adapted to form a tape of retaining elements comprising a base presenting a bottom face and a top face, the top face of the base being provided with retaining elements; and
   substrate drive means, adapted to apply the substrate against the bottom face of the tape of retaining elements downstream from the molding material dispenser means.

In an example, said drive means comprise at least one roller.

Said roller is typically configured so as to press in non-uniform manner against the bottom face of the base so as to provide non-uniform bonding between the base and the substrate.

This third aspect also provides a retaining device, comprising a plastics tape extending in the longitudinal direction comprising a base presenting a bottom face and a top face and including a plurality of retaining elements extending from said top face, and a substrate secured to the bottom face of the base;
   the retaining device being characterized in that the substrate penetrates into the base beyond a mean plane defined by the bottom face of the base of the tape.

In an example, the substrate is a layer of nonwoven material, and wherein portions of fibers and/or filaments of the layer of nonwoven material are encapsulated in the base.

In a variant, the substrate is a plastics film, an elastic film, or a composite film, and wherein the surface area of the film in contact with the bottom face is greater than the surface area of the projection of the surface of the film onto a plane defined by the bottom face of the base.

Fourth Aspect of the Disclosure

In a fourth aspect, the present disclosure provides a method of forming a retaining device with hooks, wherein:
- a molding strip is provided that presents an inside face and an outside face, and that has a plurality of cavities, each cavity defining a stem extending from the outside face towards the inside face and including an end forming a head that extends from the stem towards the inside face of the molding strip;
- the molding strip is positioned on rotary drive means comprising at least two rollers, the inside face of the molding strip being arranged to bear against the drive means;
- molding material is dispensed against the outside face of the molding strip by material dispenser means arranged facing the molding strip in such a manner as to define a gap between the material dispenser means and the molding strip, the step of dispensing the molding material being performed in such a manner as to fill said gap and the cavities with molding material so as to form a tape comprising a base of thickness that is defined by the gap, and first preforms projecting from said base, each comprising a stem and a head, the first preforms being formed by the plastics material in the cavities of the molding strip; and
- the strip and the first preforms are unmolded in such a manner as to deform the first preforms plastically so as to obtain second preforms of shape that is different from the first preforms.

In an example, after the unmolding step, a forming step is performed during which the unmolded tape is inserted into a forming device so as to modify the shape of the heads of the second preforms by forming.

In an example, the forming device comprises at least two rotary elements, each of said rotary elements having a speed that is different from the drive speed of the tape.

In an example, the molding material is polypropylene, and wherein during the forming step, at least one forming element of the forming device is maintained at a temperature lying in the range 75° C. to 165° C., in particular substantially equal to 120° C., or indeed substantially equal to 140° C., or more precisely substantially equal to 150° C.

In an example, the step of unmolding the tape and the first preforms leads to a change in the height of the head and/or of the stem, and/or to a change in the width of the head and/or of the stem.

In an example, the forming device comprises an element at ambient temperature (or at a non-regulated temperature), and at least one element at a temperature that lies strictly between the heat deflection temperature (HDT) and the melting temperature of the molding material.

In an example, the forming step produces at least one deformation of a portion of the head of each of the second preforms, said deformation tending, for each preform, to deform one of the ends of the head of the preform so as to form a rib on the top face of the head of the preform.

In an example, during the step of dispensing the molding material, the gap between the material dispenser means and the molding strip lies in the range 10 µm to 700 µm, more particularly in the range 10 µm to 500 µm, or more precisely in the range 50 µm to 100 µm.

In an example, the step of dispensing the molding material is performed in such a manner that the molding material is dispensed while the inside face of the molding strip is bearing against a molding strip drive roller.

In an example, the step of dispensing the molding material is performed through a sheet of nonwoven material arranged on the molding strip, said sheet of nonwoven material including empty zones allowing the molding material to pass through.

The molding material is then typically polypropylene or a formulation based on polypropylene, and the step of dispensing the molding material is typically performed at a pressure lying in the range 10 bar to 100 bar, or indeed in the range 30 bar to 50 bar, and at a temperature lying in the range 150° C. to 300° C.

The molding strip is then typically driven at a travel speed lying in the range 1 meter per minute (m/min) to 500 m/min, more particularly in the range 5 m/min to 250 m/min.

In an example, the unmolding step is performed while the base of the tape is at a temperature lower than the melting temperature of the molding material, or lower than the heat deflection temperature of the molding material.

In an example, the step of dispensing the molding material is performed so as to form a tape extending in a longitudinal direction and comprising a base presenting two edges in the longitudinal direction, each of the edges presenting highs and lows, wherein the maximum offset between the highs and the lows in a direction transverse to the longitudinal direction is less than 1.0 mm over a length in the longitudinal direction corresponding to three consecutive highs.

In an example, prior to the unmolding step, a layer of nonwoven material is applied against the bottom face of the base before the bottom face of the base has solidified so as to cause portions of the fibers and/or filaments of the layer of nonwoven material to penetrate into the base, at least in part.

During the step of applying the nonwoven material against the bottom face of the base, the layer of nonwoven material is then typically at ambient temperature (or at a temperature that is not regulated), and the temperature of the base is the result only of the step of forming the tape.

During the step of applying the layer of nonwoven material against the bottom face of the base, the bottom face of the base is typically at a temperature lower than its melting temperature.

This fourth aspect also provides apparatus for performing a method as defined above, and comprising:
- a molding device, comprising a molding strip mounted on rotary drive means (e.g. comprising at least two rollers), the molding strip having an inside face and an outside face, the inside face being mounted to bear against the rollers, the molding strip having a plurality of cavities, each cavity defining a stem extending from the outside face towards the inside face, and including an end forming a head extending from the stem towards the inside face of the molding strip;
- material dispenser means arranged facing the molding device, and configured in such a manner as to dispense molding material at a point of the molding strip so as to form a tape of preforms having a base of thickness defined by a gap between the material dispenser means and the molding strip, and first preforms, each comprising a stem and a head projecting from said base; and
- unmolding means configured to unmold the tape of preforms formed in the molding strip;
- the molding strip and the unmolding means being configured so that unmolding the tape of preforms leads to the first preforms being deformed in such a manner as to form second preforms of a shape that is different from the first preforms.

In an example, the apparatus further comprises a forming device configured to modify the heads of the preforms by forming.

In an example, the apparatus further comprises drive means for driving a layer of nonwoven material and adapted to press a nonwoven material against the bottom face of the base of the tape of retaining elements downstream from the material dispenser means.

This fourth aspect further provides apparatus for forming a retaining device with hooks, the apparatus comprising:
- a molding device, comprising a molding strip mounted on rotary drive means (e.g. comprising at least two rollers), the molding strip having an inside face and an outside face, the inside face being mounted to bear against the rollers, the molding strip having a plurality of cavities, each cavity defining a stem extending from the outside face towards the inside face, and including an end forming a head extending from the stem towards the inside face of the molding strip;
- material dispenser means arranged facing the molding device, and configured in such a manner as to dispense molding material at a point of the molding strip so as to form a tape of preforms having a base of thickness defined by the gap, and first preforms, each comprising a stem and a head projecting from said base; and
- unmolding means configured to unmold the tape of preforms formed in the molding strip;
- the molding strip and the unmolding means being configured so that unmolding the strip of preforms leads to the first preforms being deformed in such a manner as to form second preforms of a shape that is different from the first preforms.

In an example, this apparatus further comprises a forming device configured to modify the heads of the preforms by forming.

In an example, the forming device comprises at least two rotary elements, one of said rotary elements including heater means or temperature regulator means configured so as to maintain it at a temperature that lies strictly between the heat deflection temperature and the melting temperature of the molding material.

In another embodiment, the head may be heated prior to the forming step so that it is at a temperature lying between the heat deflection temperature of the molding material and the melting temperature of the molding material, the forming device including an element operating at a temperature that is less than the heat deflection temperature of the molding material, for example.

In an example, said rotary elements of the forming device have respective speeds that are different from that of the molding device.

In an example, the forming means are configured so as to form at least one fold in the head of each preform. More particularly, said at least one fold tends to fold at least one end of the head of the preform towards a central portion of the head of the preform.

In an example, the forming device comprises a rotary element configured in such a manner as to operate at ambient temperature or at a non-regulated temperature, and at least one a rotary element having heater means adapted so that said at least one rotary element operates at a temperature that lies strictly between the heat deflection temperature and the melting temperature of the molding material.

In an example, the rotary elements of the forming device are configured so as to be driven in rotation at distinct speeds of rotation, the rotary element having the lower temperature having a relative speed that is different from the rotary element(s) having a higher temperature.

In an example, the cavities of the molding strips extend in a cavity direction that is substantially perpendicular to the outside face of the molding strip, and each defines a stem and a head, each presenting symmetry of rotation about said cavity direction, the head having a dimension that is greater than the maximum dimension of the stem as measured radially relative to the cavity direction.

In an example, the material dispenser means are configured so as to dispense the molding material at a point of the molding strip while the inside face of the molding strip is pressing against a roller of the rotary drive means.

In an example, the gap between the material dispenser means and the molding strip lies in the range 10 µm to 700 µm, more particularly in the range 20 µm to 500 µm, or more precisely in the range 50 µm to 100 µm.

In an example, the rotary drive means for driving the molding strip comprise at least two rollers, each having a diameter lying in the range 10 times to 10,000 times the thickness of the molding strip, in particular in the range 50 times to 5000 times the thickness of the molding strip, e.g. in the range 100 mm to 250 mm.

In an example, the apparatus further comprises means for pressing a strip of nonwoven material and/or of woven material and/or of knitted material against the molding strip upstream from the material dispenser means.

In an example, the cavities in the molding strip are through cavities.

In an example, the apparatus further comprises a scraper device arranged on the inside face of the molding strip, downstream from the material dispenser means.

In an example, the molding strip includes an inner strip made of rubber forming its inside face, the ends of the cavities of the molding strip being formed in said inner strip made of rubber.

Fifth Aspect of the Disclosure

In a fifth aspect, the present disclosure provides a method of forming a retaining device with hooks, wherein:
- a molding strip is provided that presents an inside face and an outside face, and that has a plurality of cavities, each cavity defining a stem extending from the outside face towards the inside face and including an end forming a head that extends from the stem towards the inside face of the molding strip;
- the molding strip is positioned on rotary drive means comprising at least two rollers, the inside face of the molding strip being arranged to bear against the drive means;
- molding material is dispensed against the outside face of the molding strip by material dispenser means arranged facing the molding strip in such a manner as to define a gap between the material dispenser means and the molding strip, the step of dispensing the molding material being performed in such a manner as to fill said gap and the cavities with molding material so as to form a tape comprising a base of thickness that is defined by the gap, and first preforms projecting from said base each comprising a stem and a head, the first preforms being formed by the plastics material in the cavities of the molding strip;
- the tape and the first preforms are unmolded; and
- the unmolded tape is inserted in a forming device so as to modify the shapes of the heads of the preforms by forming.

In an example, during the step of unmolding the tape and the first preforms, the first preforms are deformed plastically so as to obtain second preforms of shape that is different from the shape of the first preforms, said second preforms subsequently being deformed by the forming device.

In an example, the forming device comprises at least two rotary elements, each of said rotary elements having a speed that is different relative to the tape.

In an example, the molding material is polypropylene, and wherein during the forming step, at least one forming element of the forming device is maintained at a temperature lying in the range 75° C. to 165° C., and in particular close to 120° C.

In an example, the step of unmolding the tape and the first preforms leads to a change in the height of the head and/or of the stem, and/or to a change in the width of the head and/or of the stem.

In an example, the forming device comprises an element at ambient temperature or at a non-regulated temperature, and at least one element at a temperature that lies strictly between the heat deflection temperature (HDT) and the melting temperature of the molding material.

In an example, the forming step produces at least one deformation of a portion of the head of each of the second preforms, said deformation tending, for each preform, to deform one of the ends of the head of the preform so as to form a rib on the top face of the head of the preform.

In an example, the step of dispensing the molding material is performed in such a manner that the molding material is dispensed while the inside face of the molding strip is bearing against a molding strip drive roller.

In an example, the step of dispensing the molding material is performed through a sheet of nonwoven material arranged on the molding strip, said sheet of nonwoven material including empty zones allowing the molding material to pass through.

In an example, during the step of dispensing the molding material, the gap between the material dispenser means and the molding strip lies in the range 10 μm to 700 μm, more particularly in the range 10 μm to 500 μm, or more precisely in the range 50 μm to 100 μm.

The molding material is then typically polypropylene, and the step of dispensing the molding material is typically performed at a pressure lying in the range 10 bar to 100 bar, or indeed in the range 30 bar to 50 bar, and at a temperature lying in the range 150° C. to 300° C.

The molding strip is then typically driven at a travel speed lying in the range 1 m/min to 500 m/min, more particularly in the range 5 m/min to 250 m/min.

In an example, the unmolding step is performed while the base of the tape is at a temperature lower than the melting temperature of the molding material, or lower than the heat deflection temperature of the molding material.

In an example, the step of dispensing the molding material is performed so as to form a tape extending in a longitudinal direction and comprising a base presenting two edges in the longitudinal direction, each of the edges presenting highs and lows, wherein the maximum offset between the highs and the lows in a direction transverse to the longitudinal direction is less than 1.0 mm over a length in the longitudinal direction corresponding to three consecutive highs.

In an example, prior to the unmolding step, a layer of nonwoven material is applied against the bottom face of the base before the bottom face of the base has solidified so as to cause portions of the fibers and/or filaments of the layer of nonwoven material to penetrate into the base, at least in part.

In an example, during the step of applying the nonwoven material against the bottom face of the base, the layer of nonwoven material is at ambient temperature or at a temperature that is not regulated, and the temperature of the base is the result only of the step of forming the tape.

In an example, during the step of applying the strip of nonwoven material against the bottom face of the base, the bottom face of the base is at a temperature lower than its melting temperature.

This fifth aspect also provides apparatus for performing a method as defined above, and comprising:
  a molding device, comprising a molding strip mounted on rotary drive means e.g. comprising at least two rollers), the molding strip having an inside face and an outside face, the inside face being mounted to bear against the rollers, the molding strip having a plurality of cavities, each cavity defining a stem extending from the outside face towards the inside face, and including an end forming a head extending from the stem towards the inside face of the molding strip;
  material dispenser means arranged facing the molding device, and configured in such a manner as to dispense molding material at a point of the molding strip so as to form a tape of preforms having a base of thickness defined by the gap, and first preforms each comprising a stem and a head projecting from said base;
  unmolding means configured to unmold the tape of preforms formed in the molding strip; and
  a forming device, configured to modify the heads of the preforms by forming.

In an example, the molding strip and the unmolding means are configured so that unmolding the strip of preforms leads to the first preforms being deformed in such a manner as to form second preforms of a shape that is different from the first preforms.

In an example, the apparatus further comprises drive means for driving a layer of nonwoven material and adapted to press a nonwoven material against the bottom face of the base of the tape of retaining elements downstream from the material dispenser means.

This fifth aspect also provides apparatus for forming a retaining device with hooks, the apparatus comprising:
  a molding device, comprising a molding strip mounted on rotary drive means, e.g. comprising at least two rollers, the molding strip having an inside face and an outside face, the inside face being mounted to bear against the rollers, the molding strip having a plurality of cavities, each cavity defining a stem extending from the outside face towards the inside face, and including an end forming a head extending from the stem towards the inside face of the molding strip;
  material dispenser means arranged facing the molding device, and configured in such a manner as to inject molding material at a point of the molding strip so as to form a tape of preforms having a base of thickness defined by the gap, and first preforms each comprising a stem and a head projecting from said base; and
  unmolding means configured to unmold the tape of preforms formed in the molding strip;
  the molding strip and the unmolding means being configured so that unmolding the strip of preforms leads to the first preforms being deformed in such a manner as to form second preforms of a shape that is different from the first preforms.

In an example, the apparatus further comprises a forming device configured to modify the heads of the preforms by forming.

In an example, the forming device comprises at least two rotary elements, one of said rotary elements including heater means or temperature regulator means configured so as to maintain it at a temperature that lies strictly between the heat deflection temperature and the melting temperature of the molding material.

In an example, said rotary elements of the forming device have respective speeds that are different from that of the molding device.

In an example, the forming means are configured so as to form at least one fold on the head of each preform, said at least one fold tending to fold at least one end of the head of the preform towards a central portion of the head of the preform.

In an example, the forming device comprises a rotary element configured in such a manner as to operate at ambient temperature or at a non-regulated temperature, and at least one rotary element having heater means adapted so that said at least one rotary element operates at a temperature that lies strictly between the heat deflection temperature and the melting temperature of the molding material.

In an example, the rotary elements of the forming device are configured so as to be driven in rotation at distinct speeds of rotation.

In an example, the cavities of the molding strips extend in a cavity direction substantially perpendicular to the outside surface of the molding strip, and each defines a stem and a head, each presenting symmetry of rotation about said cavity direction, the head having a dimension that is greater than the maximum dimension of the stem as measured radially relative to the cavity direction.

In an example, the material dispenser means are configured so as to inject the molding material at a point of the molding strip while the inside face of the molding strip is pressing against a roller of the rotary drive means.

In an example, the gap between the material dispenser means and the molding strip lies in the range 10 µm to 700 µm, more particularly in the range 20 µm to 500 µm, or more precisely in the range 50 µm to 100 µm.

In an example, the rotary drive means for driving the molding strip comprise at least two rollers, each having a diameter lying in the range 10 times to 10,000 times the thickness of the molding strip, in particular in the range 50 times to 5000 times the thickness of the molding strip, e.g. in the range 100 mm to 250 mm.

In an example, the apparatus further comprises means for pressing a strip of nonwoven material against the molding strip upstream from the material dispenser means.

In an example, the cavities in the molding strip are through cavities.

In an example, the apparatus further comprises a scraper device arranged on the inside face of the molding strip, downstream from the material dispenser means.

In an example, the molding strip includes an inner strip made of rubber forming its inside face, the ends of the cavities of the molding strip being formed in said inner strip made of rubber.

Sixth Aspect of the Disclosure

In a sixth aspect, the present disclosure relates to a retaining device comprising
an elastic film extending in a longitudinal direction;
a plastics tape extending in the longitudinal direction comprising a base presenting a bottom face and a top face and including a plurality of retaining elements extending from said top face;
the retaining device being characterized in that the film, the base, and the retaining elements are formed integrally by means of extrusion.

In an example, the film, base, and the retaining elements are formed integrally by successive and/or simultaneous extrusion operations.

In an example, the transition between the elastic film and the base of the tape, beside the top face and/or the bottom face, is continuous.

In an example, the plastics tape and the elastic film form an intermediate layer having a bottom face and a top face, said device further comprising a layer of nonwoven material secured to at least a portion of the bottom face of the intermediate layer.

The securing is then typically performed by partial encapsulation in said intermediate layer.

The partial encapsulation is typically performed in the elastic film of the intermediate layer.

The partial encapsulation is typically performed in the plastics tape of the intermediate layer. The partial encapsulation may be performed in the plastics tape of said intermediate layer and in the elastic film of said intermediate layer.

In an example, the device further comprises a nonwoven layer secured to the top face of the intermediate layer.

The nonwoven layer is then typically secured to the top face of the intermediate layer by means of adhesive.

In an example, at least one of the bottom face and/or of the top face of the intermediate layer presents elements projecting from said face, which projecting elements are distinct from the retaining elements.

The projecting elements are typically in the form of spikes.

In an example, the base of the plastics tape presents a thickness lying in the range 10 µm to 700 µm, where the thickness is the distance between the top face and a bottom face, each of the retaining elements is constituted by a stem and by a head;
the stem having a bottom end connected to the base, and a top end opposite from the bottom end, the head surmounting the top end of the stem, and having a bottom face facing towards the base and a top face opposite from the bottom face, and wherein the top face of the head of each retaining element includes a rib.

In an example, the nonwoven layer is activated. The nonwoven material may be activated prior to lamination or indeed the laminate may be activated over its entire width.

This sixth aspect also provides a method of forming a retaining device with hooks, wherein:
a plastics material in the molten state is dispensed in a molding device so as to form a tape having a base and retaining elements projecting from a face of said base; and
an elastic material in the molten state is dispensed;
in such a manner that the plastics tape and the elastic film and the retaining elements are made integrally by extrusion, the tape of plastics material and the elastic film forming an intermediate layer.

In an example, the elastic film is formed to extend the tape.

In an example, after making the intermediate layer, a step is performed of applying a nonwoven layer against the bottom face of the intermediate layer before said bottom face of the intermediate layer solidifies, in such a manner as to cause portions of fibers and/or filaments of the nonwoven layer to penetrate at least in part into the intermediate layer.

During the step of applying the nonwoven layer against the bottom face of the intermediate layer, the layer of nonwoven material is typically at ambient temperature or at a non-regulated temperature, and the temperature of the bottom face of the intermediate layer is the result solely of the step of making the intermediate layer.

In an example, the method includes the step of applying a layer of nonwoven material against the top face of the intermediate layer.

The layer of nonwoven material is then typically bonded to the top face of the intermediate layer, typically by using an adhesive.

In an example, prior to forming the intermediate layer, a support layer is positioned on at least a portion of the molding device.

In an example, the method includes a prior step of activating the layer(s) of nonwoven material.

In an example, prior to dispensing material, a molding strip is provided presenting an inside face and an outside face, and having a plurality of cavities, each cavity defining a stem extending from the outside face towards the inside face, and including an end that forms a head extending from the end of the stem towards the inside face of the molding strip, the molding strip is positioned on rotary drive means, e.g. comprising at least two rollers, the inside face of the molding strip being arranged to press against the drive means;

molding material is then dispensed by material dispenser means arranged facing the molding strip in such a manner as to define a gap between the material dispenser means and the molding strip, the molding material being dispensed in such a manner as to fill said gap and the cavities with molding material so as to form a tape comprising a base of thickness that is defined by the gap, and first preforms projecting from said base, each comprising a stem and a head, the first preforms being formed by the plastics material in the cavities of the molding strip; and wherein the dispensing of material is followed by an unmolding step in which the tape and the first preforms are unmolded in such a manner as to deform the first preforms plastically so as to obtain second preforms of shape that is different from the shape of the first preforms.

After the unmolding step, a forming step is typically performed during which the unmolded tape is inserted into a forming device so as to modify the shape of the heads of the second preforms by forming.

SUMMARY OF THE FIGURES

Other characteristics, objects, and advantages of the present disclosure appear from the following description, which is purely illustrative and non-limiting, and which should be read with reference to the accompanying drawings, in which.

In all of the figures, elements that are in common are identified by identical numerical references.

DETAILED DESCRIPTION

Figure 1:
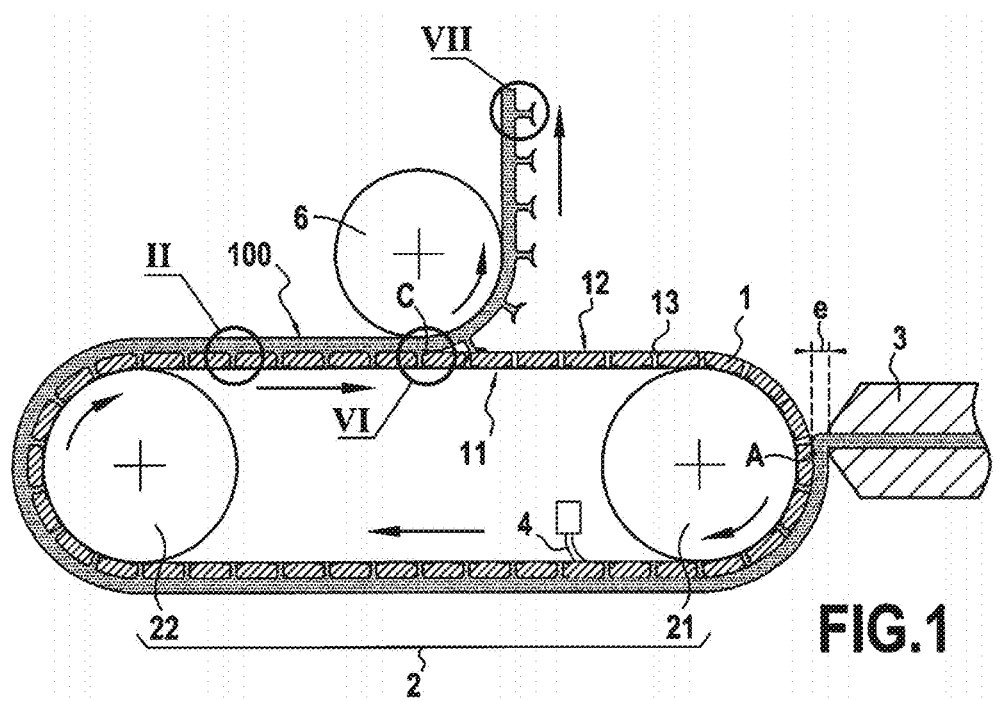
FIG. 1 is a diagram showing an example of apparatus for making a retaining device with hooks.

FIG. 1 is a diagram showing an example of apparatus for making a retaining device with hooks.

The apparatus as shown comprises a molding strip 1 positioned on rotary drive means 2 comprising in this example two rollers 21 and 22, and material dispenser means 3 adapted to inject molding material, which may for example be a plastics material and/or an elastic material.

The unit formed by the molding strip 1 and the rotary drive means 2 thus forms a molding device.

The example shown comprising two rollers 21 and 22 is not limiting, it being possible to vary the number and the arrangement of the roller(s), in particular in order to adapt to the length of the molding strip 1 and to the various stations of the apparatus. By way of example, it would be possible to use three rollers, or indeed only one, such that the molding strip is arranged on the periphery of a single roller. In particular, only one of the two rollers need be driven in rotation by motor means, e.g. the roller 21, the other roller 22 being free, i.e. without motor means, and being driven in rotation by the molding strip, itself driven by the roller 21.

The molding strip 1 as shown comprises an inside face 11 and an outside face 12, the inside face 11 being in contact with the rotary drive means 2.

The material dispenser means 3 are arranged to inject the molding material onto the outside face 12 of the molding strip 1.

More precisely, the material dispenser means 3 are arranged facing the molding strip 1, being spaced apart from the molding strip 1 so as to define a gap e shown in FIG. 1. Reference A identifies the limit of the material injected onto the outside face 12 of the molding strip 1, corresponding to the rear face of the material injected onto the molding strip 1, where "rear" is taken relative to the travel direction of the molding strip 1.

The molding strip 1 is provided with a plurality of cavities for making the hooks of the retaining device with hooks.

Each cavity 13 is formed in such a manner as to define a stem 14 extending from the outside face 12 of the molding strip 1 towards its inside face 11, together with a head 15 extending between the stem 14 and the inside face 11 of the molding strip 1.

In the example shown, the heads 15 of the cavities 13 open out into the inside face 11 of the molding strip 1. The cavities 13 are thus through cavities. Such an embodiment is not limiting, it being equally possible for the cavities 13 to be blind cavities, and thus for them not to open out into the inside face 11 of the molding strip 1.

The portions of the cavity 13 that form the stem 14 typically extend in a direction perpendicular to the outside face 12 of the molding strip 1. The portions of the cavities 13 forming the stem 14 are typically shapes of revolution around an axis perpendicular to the outside face 12 of the molding strip 1, or shapes that present a plane of symmetry extending in a direction parallel to the travel direction of the molding strip 1 and/or in a direction perpendicular to the travel direction of the molding strip 1.

By way of example, the portions of the cavities 13 forming the stems 14 are generally frustoconical or circularly cylindrical in shape about an axis perpendicular to the outside face 12 of the molding strip 1, and each of them presents a rounded fillet at the junction with the outside face 12 of the molding strip 1.

The portions of the cavities 13 forming the heads 15 typically extend radially or transversely relative to an axis perpendicular to the outside face 12 of the molding strip 1, and they may present symmetry of rotation about this axis perpendicular to the outside face 12 of the molding strip 1. The portions of the cavities 13 forming the heads 15 typically present a shape that is substantially frustoconical or hexahedral.

The portions of the cavities 13 forming the heads 15 may be linear or rounded, e.g. to form portions that are curved towards the inside face 11 or towards the outside face 12 of the molding strip 1 extending from the portions of the cavities 13 forming the stems 14.

The portions of the cavities 13 forming the heads 15 may present a thickness that is constant or varying.

In the example shown in the figures, the portions of the cavities 13 forming the head 15 extend radially around the portions of the cavities 13 forming the stems 14, and they present the general shape of a disk, as can be seen in particular in FIG. 2, which is described below.

On its inside face 11 or on its outside face 12, the molding strip 1 may present particular texturing, such as slots, an array of grooves, or an array of passages forming vents or spikes, or it may be substantially smooth.

The molding strip 1 may be made up by superposing a plurality of strips, and it is thus not necessarily a single piece or made of a single material.

The material dispenser means 3 are typically arranged so as to inject molding material into the molding strip 1 at a section of the molding strip 1 where it bears against a drive roller, specifically the drive roller 21 in the example shown in FIG. 1. The drive roller then forms a bottom for the cavities 13.

When the molding material is injected while the molding strip 1 is not bearing against a drive roller, then the material dispenser means 3 may include a base arranged on the other side of the molding strip 1, so that the inside face 11 of the molding strip 1 bears against the base while material is being injected, the base then forming a bottom for the cavities 13 of the molding strip 1.

The molding strip 1 typically presents a thickness lying in the range 5 µm to 5000 µm, or indeed in the range 5 µm to 2000 µm, or more precisely in the range 20 µm to 800 µm, or indeed in the range 100 µm to 500 µm.

In the longitudinal direction, the molding strip may present a length lying in the range 0.5 meters (m) to 5 m.

In the transverse direction, the molding strip may present a width lying in the range 5 mm to 3000 mm.

Each of the rollers 21 and 22 typically presents a diameter lying in the range 10 times to 10,000 times the thickness of the molding strip 1, or indeed 50 times to 5000 times the thickness of the molding strip 1, more precisely a diameter lying in the range 50 mm to 750 mm, or more particularly a diameter lying in the range 100 mm to 300 mm.

When compared with conventional forming means such as rollers in which the mold cavities are made directly, the use of a molding strip 1 associated with drive means 2 is advantageous for several reasons.

The use of a molding strip is particularly advantageous in terms of modularity. Specifically, the molding strip can be removed and replaced easily relative to the drive means, unlike a solid roller for which disassembly and reassembly operations are particularly complex to carry out. Such an advantage can be seen in particular when both rollers 21 and 22 are fastened at one end only to a frame, leaving the other end free for receiving and/or removing the molding strip. It is also possible to use guide means for the molding strip in order to facilitate inserting and/or removing it.

Furthermore, a molding strip is much easier to make in comparison with making a roller that includes molding cavities. Specifically, such rollers are typically made by stacking successive slices, thus requiring multiple machining operations and leading to major constraints both during assembly and on each occasion there is a change in the specification of the hooks, and such rollers present considerable weight, requiring them to be held at both ends, with the consequence of making them more complex to replace.

Furthermore, the use of a molding strip coupled to drive means makes it possible to make a molding device of considerable length while conserving fabrication and an installation that are simple, in particular when one of the rollers is mounted to be movable in translation so as to modify the offset between the rollers, and thus enable the tension of the molding strip to be adjusted. Conversely, making molding rollers of large diameter is typically complex, and leads to molding means of very great weight, thus implying that the entire assembly needs to be overdimensioned in order to be capable of supporting such rollers. Furthermore, making such molding rollers of large diameter does not make it possible to obtain acceptable dimensional tolerances.

The various steps in forming a retaining device with hooks by means of this apparatus are described below with reference to FIGS. 1 to 4.

Figure 2:
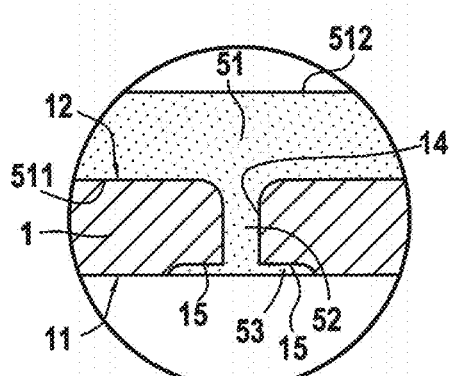
FIGS. 2 to 10 are detail views of the shapes of the resulting retaining elements or preforms.

FIG. 2 shows the molding material once it has been injected into the molding strip 1. FIG. 2 is a side view (in section) showing the material in the cavities 13 of the molding strip 1.

As can be seen in FIG. 2, the molding material penetrates into the molding strip so as to fill each cavity 13, thereby forming a stem and head blank for each of the hooks.

A layer of molding material is also deposited on the outside face 12 of the molding strip 1 so as to form a base for the retaining device, the thickness of this layer of molding material being determined by the gap e between the material dispenser means 3 and the molding strip 1.

The gap e typically presents a thickness lying in the range 10 µm to 700 µm, or typically in the range 10 µm to 500 µm, or indeed in the range 20 µm to 100 µm.

In the example shown, the cavities 13 in the molding strip 1 are through cavities. The apparatus may then include an element such as a scraper 4 positioned to scrape the inside face 11 of the molding strip 1 in order to remove excess molding material, as required. The term "injection" is used to designate the action of shaping a molding material by the melting technique, e.g. dispensing, delivering, molding, injecting, extruding.

Injecting molding material into the molding strip 1 by using the material dispenser means 3 thus makes it possible to form a base 51 and a plurality of elements or preforms, each comprising a stem 52 and a head 53, the assembly thus forming a tape 100. As described below, the elements comprising the stems 52 and the heads 53 are typically first preforms that are subsequently subjected to a shaping step in order to make hooks.

A longitudinal direction is defined relative to the travel direction of the tape 100, this longitudinal direction being parallel to the travel direction of the tape 100. This longitudinal direction is commonly referred to as the "machine direction" or "MD". The longitudinal direction is designated by the axis MD in the figures.

A transverse direction is also defined, commonly referred to as the "cross direction" or "CD", corresponding to a direction perpendicular to the longitudinal direction, and extending parallel to a plane face of the tape 100. The transverse direction is designated by the axis CD in the figures.

The base 51 presents a top face 511 and a bottom face 512 that are typically substantially parallel, the top face 511 being the face provided with hooks and/or preforms.

The base 51 typically presents a thickness lying in the range 10 μm to 700 μm, or typically in the range 20 μm to 500 μm, or indeed in the range 50 μm to 100 μm.

The base 51 typically presents a width lying in the range 1 mm to 3000 mm, or more precisely in the range 2 mm to 400 mm, or indeed between 3 mm and 100 mm, the width of the base 51 being measured along the direction that is transverse relative to the longitudinal direction, e.g. along a direction parallel to the outside face 12 of the molding strip 1.

Figure 3:
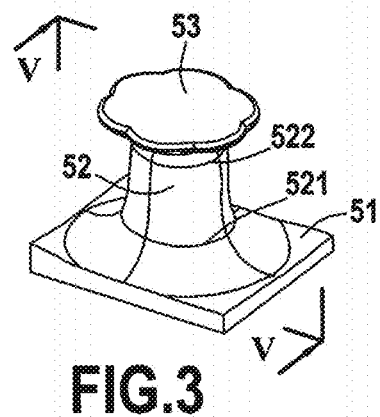
Figure 4:
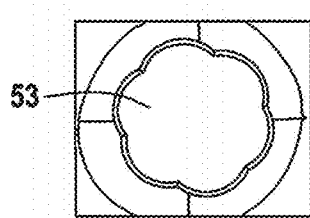
Figure 5:
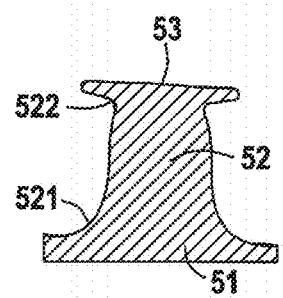

FIGS. 3, 4, 5 are three views showing hook preforms as formed in this way by injecting material into the molding strip 1, respectively in a perspective view, a plan view, and a section view.

It should be understood that these figures show the molding material as it is within the cavities 13, each time shown isolated from the molding strip 1 in order to show its shape in detail.

As can be seen in these figures, the hook preforms as formed in this way, specifically the first preforms, are each in the shape of a stem 52 of generally cylindrical or conical shape surmounted by a head 53.

A bottom end 521 of the stem 52 is defined, connecting the stem to the base 51, and a top end 522 of the stem 52 is defined opposite from the bottom end 521 of the stem 52.

The head 53 extends from the top end 522 of the stem 52.

In the example shown, the head 53 is hexagonal in shape with edges forming circular arcs. The head 53 thus has a plurality of portions extending radially from the top end 522 of the stem 52. The head 53, and more generally the assembly formed by the head 53 and the stem 52, thus presents symmetry of rotation about an axis passing through the center of the stem 52 and of the head 53. It is possible to envisage various other shapes for the head 53; the purpose of the example shown is merely to illustrate one embodiment. The head 53 may in particular be hexagonal in shape.

The apparatus as described and the associated method make it possible to operate at high tape formation speeds.

Specifically, conventional production lines for making retaining devices with hooks operate at low formation speeds, these low formation speeds being compensated by widening the tape that is being formed. This limit in terms of formation speed is the result in particular of the time needed for the injected material to solidify.

In contrast, the installation and the method as described make it possible to form a tape at a high formation speed, e.g. faster than 20 m/min, or indeed faster than 40 m/min, 60 m/min, 80 m/min, 100 m/min, 120 m/min, or 150 m/min, or indeed in the range 1 m/min to 500 m/min, or indeed in the range 5 m/min to 250 m/min. Specifically, the method described does not require the material that is injected to form the hooks to be cooled completely, and, moreover, using a molding strip of small thermal inertia, possibly presenting through cavities, makes it possible to improve considerably the rate at which the tape solidifies.

In an embodiment, the material dispenser means 3 may inject the molding material through a sheet of nonwoven material arranged on the outside face 12 of the molding strip 1.

A sheet of nonwoven material is then arranged on the outside face 12 of the molding strip 1 upstream from the material dispenser means 3. The sheet of nonwoven material may present empty zones to facilitate passing the molding material, and also zones that prevent the molding material from passing.

Such an embodiment thus makes it possible to obtain a tape presenting a layer of nonwoven material on its top face, i.e. its face presenting the retaining elements, i.e. the hooks. Injecting the molding material directly onto the sheet of nonwoven material thus makes it possible to ensure strong cohesion of the nonwoven material with the base 51.

Furthermore, by calibrating the distribution of the empty zones that facilitate passage of the molding material and of the zones that prevent passage of the molding material, it is possible to define a pattern for the distribution of the hooks.

The substrate in the calibrated zone typically presents air permeability that is greater than 2000 liters per square meter per second (L/m2/s), more particularly greater than 4000 L/m2/s in the hook-passing zone. This permeability characteristic is either intrinsic to the substrate, or else it is imparted to the substrate by treatment, by drilling, by punching, by needling, by suction, by embossing, or by some other technique. In an example, the substrate may be a nonwoven material, e.g. a printed nonwoven material. By way of example, the permeability of the substrate may be measured using the 1995 ISO 9237 standard at a pressure of 200 pascals (Pa) with 20 square centimeters (cm2) circular test pieces.

The weight of the nonwoven material typically lies in the range 2 grams per square meter (g/m2) to 45 g/m2. When the permeability of the nonwoven material is intrinsic, the permeability may be less than 15,000 L/m2/s, or indeed less than 7500 L/m2/s. The nonwoven material used is typically a nonwoven material of thickness lying in the range 0.10 mm to 0.8 mm, in particular in the range 0.20 mm to 0.60 mm. By way of example, the thickness of the nonwoven material may be measured in compliance with the 1997 standard NF EN ISO 9073-2 using its method A for normal nonwovens at a pressure of 0.5 kilopascals (kPa) and for a duration of 10 seconds (s).

The nonwoven material may also present weak mechanical strength, locally, or it may be mechanically weak intrinsically, such that the nonwoven material is perforated by the molding material when making the hooks or preforms.

The material dispenser means 3 may be adapted to dispense two distinct materials simultaneously or successively, thus making it possible to define two zones made of two distinct materials in the tape 100.

More precisely, the material dispenser means 3 may be adapted to inject simultaneously a molding material such as polypropylene for forming the base 51 and the hooks, and an elastic material for forming an elastic margin extending the base 51.

The molding strip 1 may then present suitable shapes for the various zones of the tape 100, for example it may present a portion provided with cavities 13 in order to form preforms or hooks corresponding to the portion where the molding material is injected, and a portion that does not present such cavities 13 corresponding to the portion where the elastic material is injected.

Figure 6:
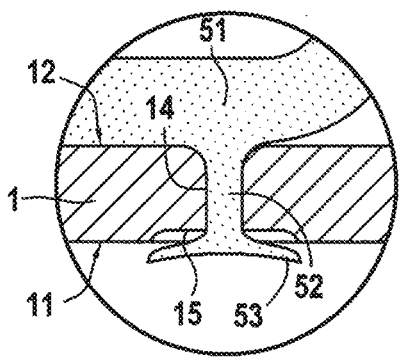

FIG. 6 is a diagram showing the unmolding of the previously-formed tape 100.

Because of the shape of the cavities, it can be understood that the heads 53 are necessarily deformed in order to enable them to be extracted from the molding strip 1.

The portions of the cavities 13 forming the stems 14 and the heads 15 are thus of dimensions suitable for allowing the heads 53 to pass through the portions of the cavities 13 that form the stems 14 in order to make unmolding possible.

Unmolding thus leads to the heads 53 being deformed, as shown diagrammatically in FIG. 6. This deformation may be of an elastic and/or plastic nature, and can thus lead to a modification of the heads 53 and of the stem 52 when the deformation is plastic, or the heads 53 and the stems 52 may return to their initial shape after unmolding when the deformation is elastic.

The nature of the deformation depends particularly on the material used, and also on the shapes of the heads 53 and of the stems 52.

In order to reduce the force exerted on the preforms during unmolding, unmolding is typically performed in a zone where the molding strip is not in contact with one of the rollers 21 and 22.

In the example shown in FIG. 6, deformation of the head 53 is shown diagrammatically as going from a generally plane shape towards the shape of a corolla of a flower, with the portions that extend radially or transversely from the top end 522 of the stem 52 thus going from a substantially plane configuration to a configuration in which they slope away from the base 51. The perimeter of the free end of the head 53 typically remains unchanged.

Thereafter, FIGS. 7 to 10 show a portion of the tape 100 as unmolded in this way.

In the example shown, unmolding the tape 100 has caused the head 53 to be deformed plastically so that its shape has been modified compared with the shape of the portion of the cavity 13 in which the head 15 was formed.

Figure 7:
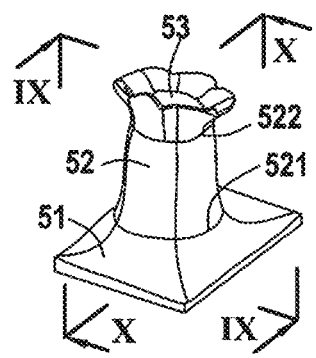
Figure 8:
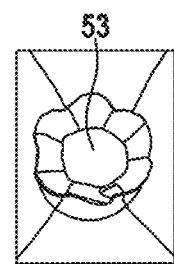
Figure 9:
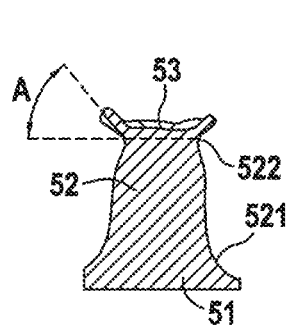
Figure 10:
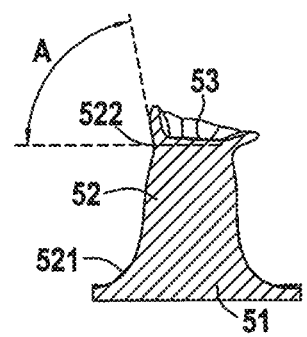

FIG. 7 is a perspective view of a tape portion 100 as unmolded in this way, FIG. 8 is a plan view, and FIGS. 9 and 10 are two section views on two mutually perpendicular planes identified in FIG. 7.

As can be seen in the figures, and in particular in FIGS. 7, 8, 9, and 10, the head 53 is asymmetrical in shape after unmolding; specifically the direction in which force is oriented during unmolding gives rise to distinct deformations in different portions of the head 53. As shown in FIG. 10, in this example, the portion of the head 53 that is positioned at the front of the preform (where "front" is taken relative to the travel direction of the molding strip 1) is raised to a greater extent than the portion of the head 53 that is positioned at the rear of the preform (where "rear" is taken relative to the travel direction of the molding strip 1), i.e. the portion of the head 53 that is positioned at the front of the preform has an angle of inclination that has been modified more than the angle by which the angle of inclination of the portion of the head 53 that is positioned at the rear of the preform has been modified. Such an embodiment is not limiting, it being possible for the head 53 to be made in such a manner as to present a shape that is symmetrical after unmolding. This deformation of the head 53 leads to the formation of a flared collar around a central portion of the head 53. This collar presents thickness variations, e.g. a thickness that tapers going away from the stem 52. Relative to the stem 52, the distal end of the collar presents a thickness that is less than the proximal end of the collar. The thickness variations make the mechanical action of folding easier and reduce the thermal inertia needed for deformation in a subsequent step, e.g. when folding and/or forming in the manner described below.

More particularly, at least a portion of the collar as formed in this way presents, in section view, an angle A of at least 15° between the mean axis of the portion under consideration of said collar and a plane parallel to the plane of the base 51. More particularly, this angle is greater than 35°, still more particularly greater than 45°. In FIG. 9, the angle A as shown is substantially equal to 55°, and in FIG. 10, the angle A is substantially equal to 80°.

As a result of forming the collar, the maximum dimension of the head of the first preform as measured in a plane parallel to the plane of the base 51 (and referred to as the width of the head) is reduced by 10% to 150%, or indeed by 25% to 100% relative to the width of the head of the second preform and/or the diameter of the stem of the second preform.

The height of the head of the second preform is increased by 5% to 100%, or indeed by 12% to 50% relative to the height of the first preform, where height is measured along a plane perpendicular to the plane of the base 51.

In an example, the width of the head is decreased by 0.05 mm to 0.2 mm for a stem diameter of about 0.2 mm, where the stem diameters of the first and second preforms are substantially identical. The height of the head is increased by 0.025 mm to 0.1 mm for a stem diameter of about 0.2 mm, where the stem diameters of the first and second preforms are substantially identical.

It is thus considered that the step of injecting molding material into the molding strip 1 forms "first" preforms for the hooks, each comprising a stem 52 and a head 53 (e.g. as shown in FIGS. 2 to 5), and that the first preforms are subsequently deformed plastically during unmolding so as to form "second" preforms of shape that is different from the shape of the first preforms, e.g. as shown in FIGS. 6 to 10. The term "plastic" is used of the deformation to specify that there remains residual or remanent deformation after elongation and release.

Figure 11:
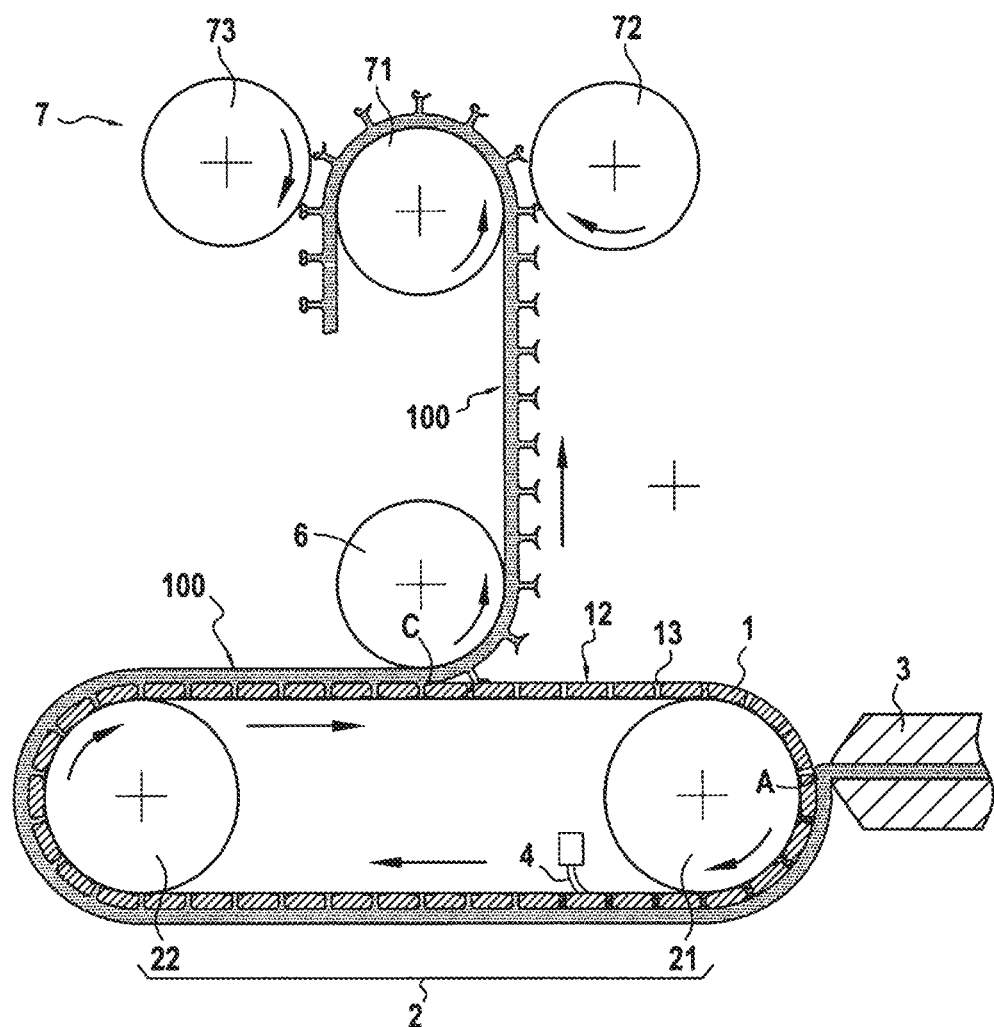
FIG. 11 reproduces the apparatus shown in FIG. 1, and adds thereto means for shaping the resulting preforms.
Figure 15:
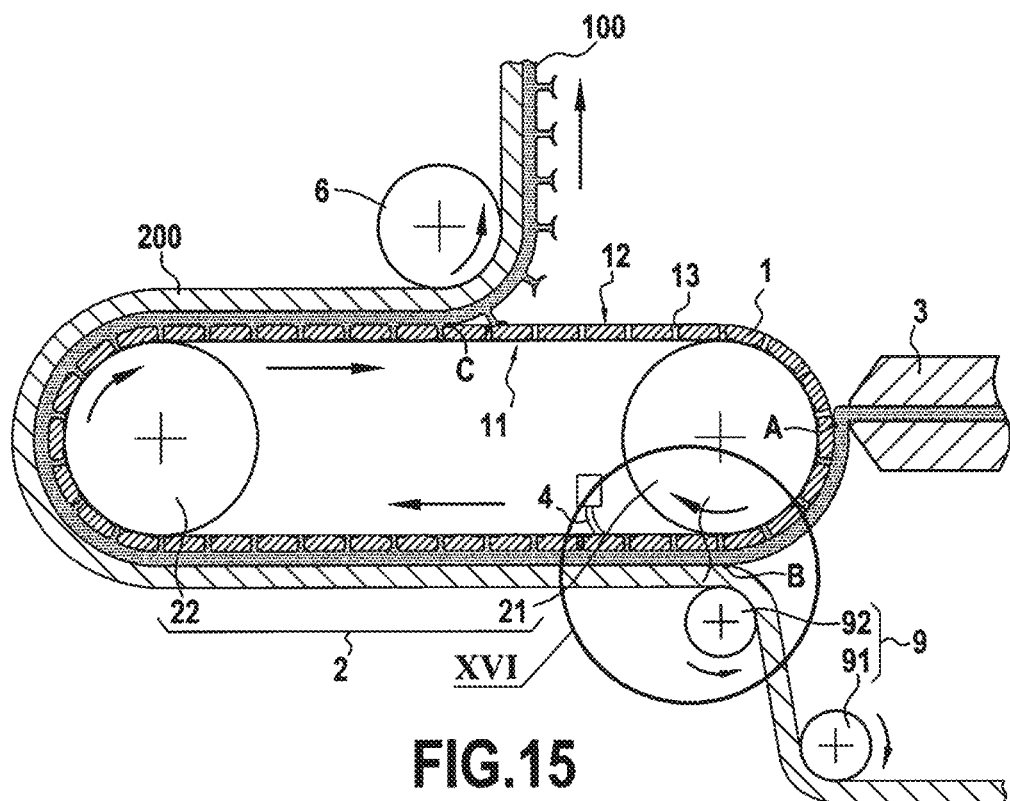
FIGS. 15 and 16 show an example of apparatus for assembling a substrate to a tape, e.g. a tape including a retaining device with hooks.

In the example shown in FIGS. 1, 11, and 15, unmolding is performed by means of an unmolding roller 6, typically configured in such a manner as to separate the base 51 of the tape 100 from the molding strip 1 under the effect of tension in the tape and its change of direction. The unmolding roller may be fitted with suction means and/or a surface having a high coefficient of friction, such as for example a rubber coating so as to improve grip and limit slip. The unmolding roller may be motordriven and present a tangential speed that is slightly faster than the speed of the strip. The separation between the tape 100 and the molding strip 1 is referenced C in the figures, this point corresponding to the level from which the base 51 of the strip 100 is no longer in contact with the molding strip 1, for example. Provision may be made for the molding strip 1 to bear against the unmolding roller 6, i.e. the unmolding roller 6 forms a lever in the molding strip 1 to facilitate unmolding the preforms and/or hooks.

The first or second preforms can then be adapted to perform the function of retaining means, or conversely not to present such properties.

Unmolding is typically performed when the base 51 of the tape 100 is at a temperature lower than the melting temperature of the molding material, or than the temperature at which the molding material bends under load, e.g. when the inside face 11 of the molding strip 1 is at a temperature of about 45° C. and the top face 511 of the base 51 is at a temperature of about 75° C. The temperature of bending under load is commonly referred to as the "heat deflection temperature" (HDT).

The unmolding step may be followed by a forming step in which the second preforms are modified, and in particular their heads 53 are modified.

FIG. 11 is a diagram showing apparatus for performing such a forming step, and FIGS. 12 and 13 show two successive changes in shape that may be implemented during such a forming step.

The apparatus shown in FIG. 11 is similar to the apparatus shown in FIG. 1, but it also includes a forming device 7 positioned downstream from the unmolding roller 6.

The forming device 7 as shown comprises a drive roller 71 and two forming rollers 72 and 73.

The function of the drive roller 71 is to guide and drive the tape 100. The function of the forming rollers 72 and 73 is to perform a forming action on the stems 52 and/or on the heads 53 of the preforms obtained by unmolding.

In the example shown, the forming device 7 comprises two forming rollers 72 and 73 serving to perform two successive forming steps that are described below. The forming device 7 is not limited to such an embodiment, and may have some other number of rollers, or more generally of forming means, in order to perform the desired forming steps. By way of example, the forming device 7 may be configured so as to perform a single deformation only, in which case it would have only one forming roller.

The forming rollers 72 and 73 are configured to exert mechanical and/or thermal force on the heads 53 and on the stems 52 of the preforms, so as to give rise to plastic deformation in order to confer a final shape to the hooks.

There follows a description of an example of forming, given with reference to FIGS. 12 to 16.

After unmolding, the tape 100 is driven by the drive roller 71 of the forming device 7. The forming rollers 72 and 73 are arranged so that each of them defines a passage between the forming roller in question and the drive roller 71 through which the tape 100 can pass.

These passages between the drive roller 71 and the forming rollers 72 and 73 are dimensioned so as to be smaller than the height of the tape 100, or where appropriate, than the height of the tape 100 and of the substrate, so that the forming rollers 72 and 73 exert a force on the preforms.

In the example shown, the two forming rollers 72 and 73 serve to perform two successive deformation steps on the preforms.

Each of the forming rollers 72 and 73 is driven in rotation at a speed of rotation that is distinct from the speed of rotation of the drive roller 71, and thus also distinct from the travel speed of the tape 100.

Taking the speed of the drive roller 71 as a reference speed, the first forming roller 72 possesses a tangential speed that is less than that of the drive roller 71, e.g. in the range 5% to 200% less than the speed of the drive roller 71, or indeed in the range 10% to 80% less than the speed of the drive roller 71, and the second forming roller 73 typically possesses a tangential speed that is greater than that of the drive roller 71, e.g. in the range 5% to 200% greater than that of the drive roller 71, or indeed in the range 10% to 80% greater than that of the drive roller 71.

Furthermore, each of the forming rollers 72 and 73 is typically maintained at a predetermined temperature as a function of the molding material, e.g. in the range 75° C. to 165° C. or more particularly substantially equal to 120° C. for a tape made of polypropylene, while the drive roller 71 is maintained at ambient temperature or at a temperature that is not regulated, or at a temperature that is lower than the heat deflection temperature, e.g. lower than 65° C.

The drive speed and temperature parameters serve to ensure that the heads 53 of the preforms adhere to and/or rub against and/or slide over the forming rollers 72 and 73, thereby giving rise to their deformation.

FIGS. 12a to 12e thus show the deformation of a preform after action of the first forming roller 72. Arrows illustrate diagrammatically the direction of rotation of the forming roller 72 and the travel direction of the tape 100.

Upstream from the forming roller 72, the preform under consideration is the same as that described above with reference to FIGS. 7 to 10.

Figure 12A:
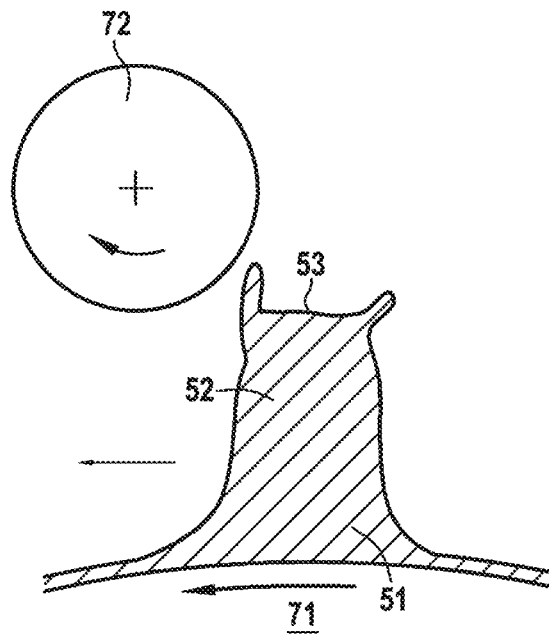
FIGS. 12A to 12E and 13A to 13J are detail views showing the steps of shaping the hooks and the shapes of the resulting hooks or preforms.

FIG. 12a is a diagram showing the tape approaching the forming roller 72.

Figure 12B:
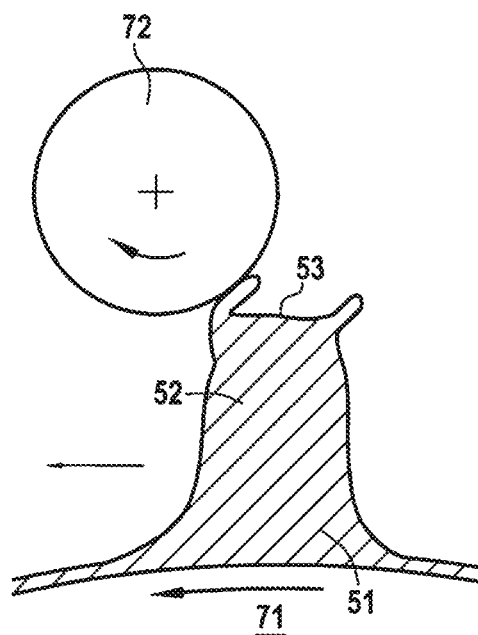

Thereafter, FIG. 12b is a diagram showing the forming action of the forming roller 72 on the preform. As can be seen in this figure, the forming roller 72 flattens and deforms a portion of the head 53. More precisely, the forming roller 72 comes into contact with some of the various portions of the head 53 that extend from the top end 522 of the stem 52, and takes them towards the central region of the head 53. This deformation of the preform gives rise to partial softening both of the portion that is taken towards a central region of the head 53 and also of the material of the central region of the head 53, and it also gives rise to a substantially plane sloping region being formed on one face of the head 53.

Figure 12C:
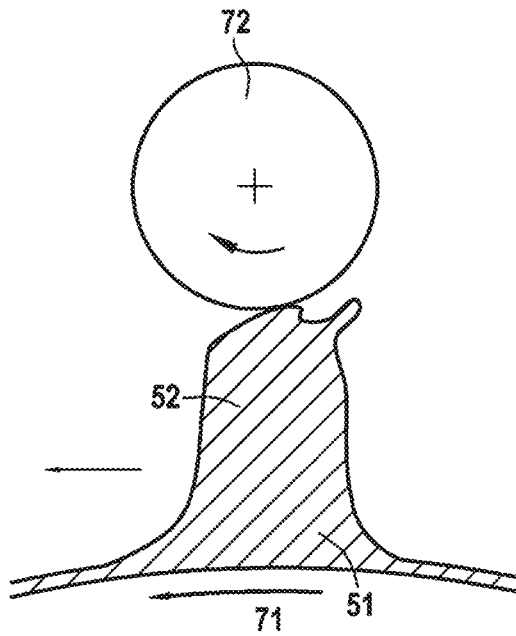
Figure 12D:
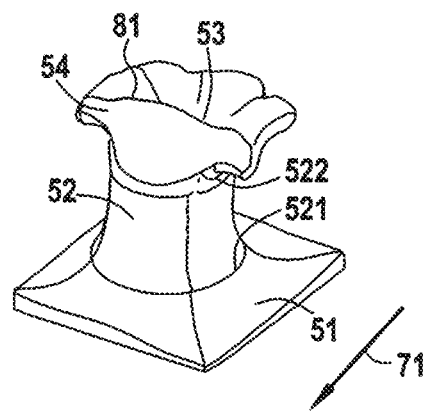
Figure 12E:
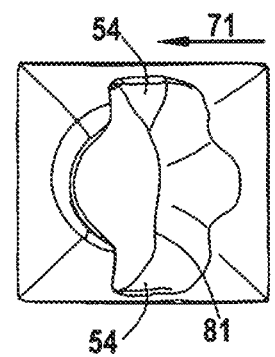

FIG. 12c is a diagram showing the preform after the action of the forming roller 72. FIGS. 12d and 12e show two other views, respectively a perspective view and a plan view of such a preform deformed in this way.

As can be seen in this figure, in this example the forming roller 72 has deformed the face of the preform at the front of the preform relative to its travel direction.

This deformation gives rise to a rib being formed that extends in a direction that is substantially transverse relative to the longitudinal direction of the tape 100.

The deformation action exerted by the forming roller 72 folds over a portion of the head 53 of the preform corresponding to the face of the preform in the travel direction, however this deformation action leads to flattening of the portions of the head of the preform 53 extending in the transverse direction relative to the travel direction, thereby forming fins extending on either side of the stem 52 in the direction extending transversely to the travel direction of the tape 100. These fins define catch portions 54 of the head 53, extending radially beyond the stem 52 of the preform from the top end 522 of the stem 52.

The deformation performed by the forming roller 72 forms a first rib 81 extending at least in part over the catch portions 54.

More generally, the deformation performed by the forming roller 72 leads to a catch portion 54 being formed together with a rib extending at least in part over the catch portion 54. The rib as formed in this way extends over the top face of the head 53, thereby providing the head 53 with mechanical reinforcement.

When the head 53 has a plurality of catch portions 54, the forming can then give rise to a single rib being formed that extends continuously between the catch portions 54, or to a plurality of disjoint ribs, each extending at least in part over one or more of the catch portions 54.

After this first deformation by the forming roller 72, second deformation may be performed by the forming roller 73.

FIGS. 13a to 13j are diagrams showing the deformation of the preform by the forming roller 73, and the shape of the resulting hook. Specifically the term "hook" is used once the preforms have been subjected to the forming steps.

Figure 13A:
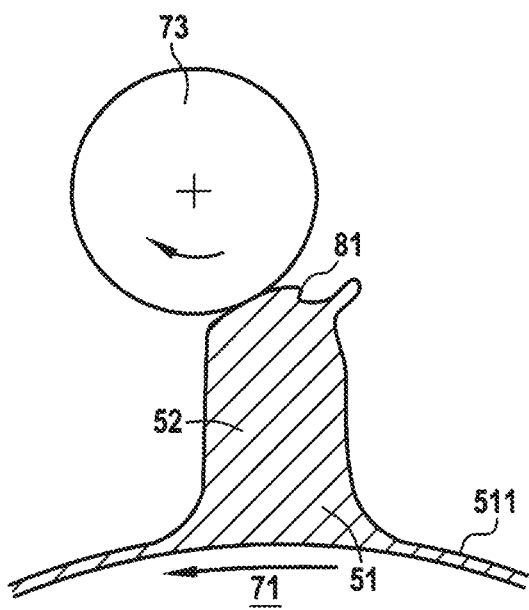
Figure 13C:
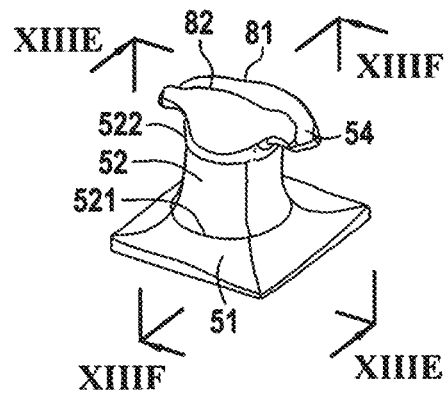
Figure 13D:
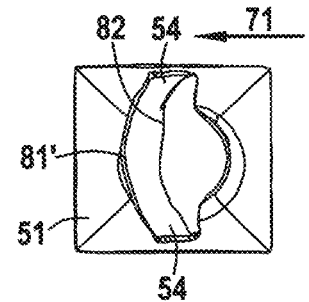
Figure 13B:
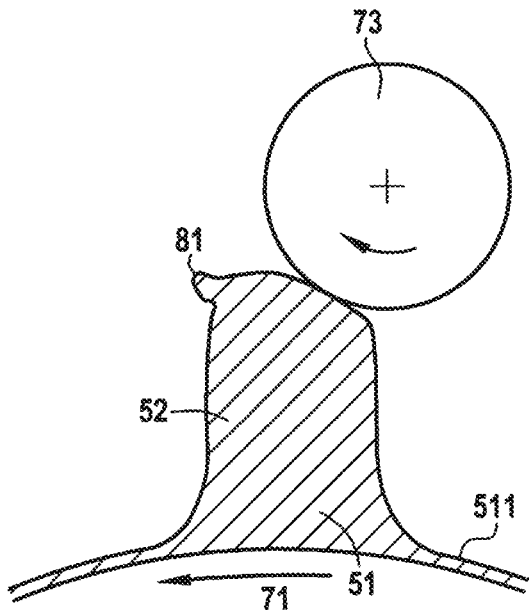

FIGS. 13a and 13b show the deformation of the preform by the forming roller 73. As can be seen in these figures, the forming roller 73 is configured to come into contact with a front portion of the preform relative to its travel direction, and to deform the head 53 of the preform.

The temperature and speed of rotation parameters of the forming roller 73 give rise to adhesion of the material of the head 53 of the preform, which serves to stand up a portion of the head 53 projecting from the stem 52.

It should be observed in particular that relative to the tape 100, the forming roller 73 has a direction of rotation that is identical to that of the above-described forming roller 72, and that it possesses a tangential speed that is greater than the tangential speed of the drive roller 71.

As a result of these direction and speed of rotation characteristics, the forming roller 73 deforms the head 53 of the preform in such a manner as to entrain the material of the head 53 towards the front of the preform (relative to its travel direction).

As a result, the forming roller 72 performs first deformation of the preform tending to take material from the front of the preform towards the central portion of the head 53, whereas the forming roller 73 performs second deformation of the preform tending to take material towards the front of the preform.

The previously-formed first rib 81 is thus taken back towards the front of the preform, and it extends beyond the stem 52 of the preform. The first rib as modified in this way is given the reference 81' in the figures. For reasons of readability, the text refers throughout to the first rib with the reference 81.

A substantially transverse second rib 82 is formed, likewise extending between two transverse ends of the hook, in this example formed by the catch portions 54.

As can be seen in FIGS. 13c to 13j, the hook as formed in this way has a first rib 81 that is a result both of the action of the first forming roller 72 and of the action of the second forming roller 73, and also a second rib 82 that is the result of the action of the second forming roller 73.

Each of these two ribs 81 and 82 extends between two opposite ends of the hook in the transverse direction, i.e. between the two catch portions 54 in the example shown.

With reference to the drive direction of the tape through the installation, the hooks define a front face and a rear face. The first rib 81 extends substantially along the front faces of the catch portions 54, while the second rib 82 extends substantially along the rear faces of the catch portions 54. The catch portions 54 thus typically comprise two distinct ribs extending at least in part over the catch portion in question.

The catch portions 54 and the first and second ribs 81 and 82 thus define transverse ends of the hooks having the same substantially U-shaped shape, with a base that is substantially plane and with the two ribs extending in a direction that is substantially perpendicular.

The ribs 81 and 82 thus provide mechanical reinforcement for the catch portions 54, which portions are configured to cooperate with complementary elements such as other hooks or loops in order to form a retaining system. The term "mechanical reinforcement" is used herein to mean that the hook deforms less under the action of a given force when it has one or more such ribs, than would a similar hook not having such a rib.

Figure 13E:
Figure 13F:
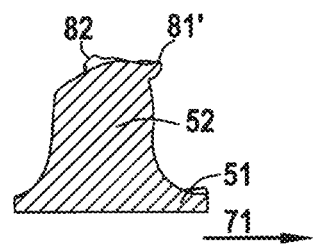
Figure 13H:
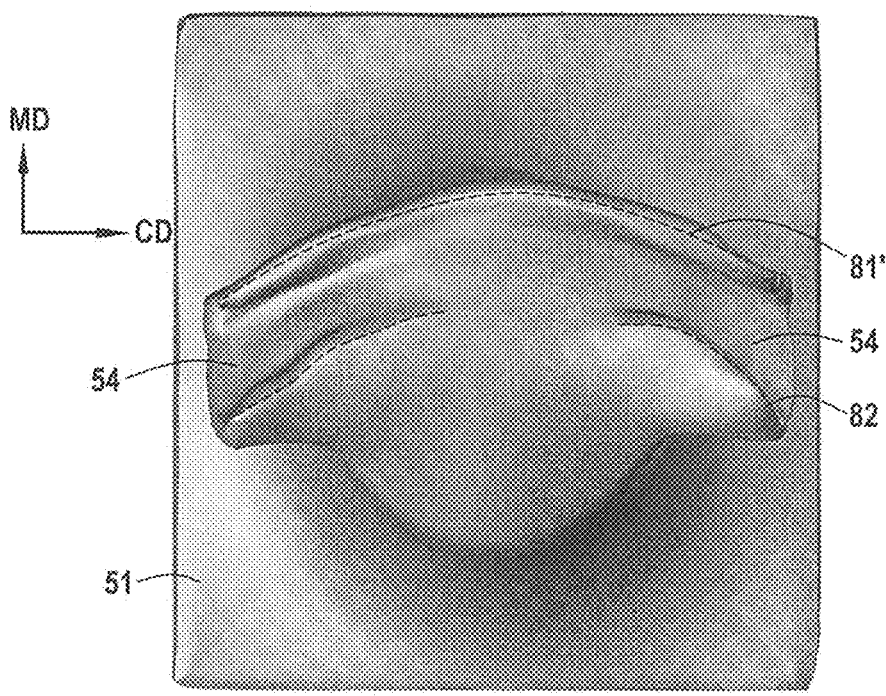
Figure 13G:
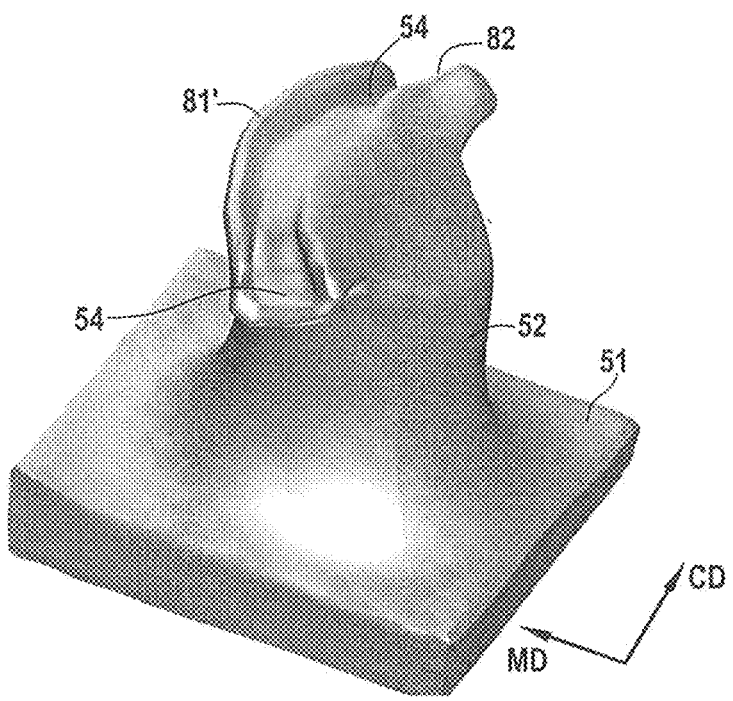
Figure 13I:
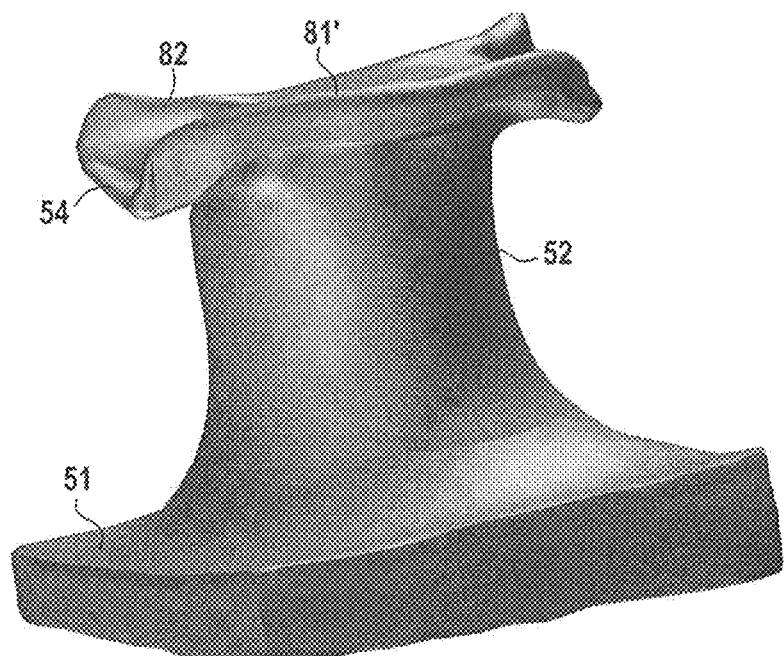
Figure 13J:
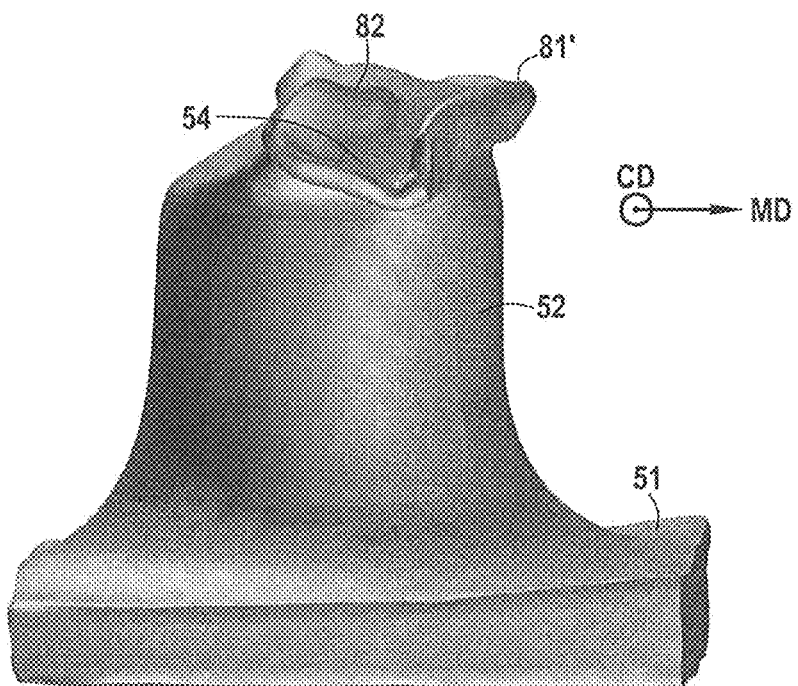

The catch portions 54 may extend substantially radially relative to the stem 51, or they may present a free end that slopes towards the base 51, as can be seen for example in FIG. 13e, 13i, or 13j, thus making it possible to improve the retention properties of the hook.

Each rib 81 and/or 82 extends over a fraction only of the head 53. The ribs thus typically extend over only a fraction of the periphery of the head 53. The combined length of the ribs typically lies in the range 5% to 95% of the length of the periphery of the head 53, or more precisely in the range 30% to 70% of the length of the periphery of the head 53. The periphery of the head 53 is considered as being the radial periphery of the head 53 after the step of forming the hooks or while being formed in the molding strip 1.

In this example, at least one of the ribs 81 and 82 typically presents a length that is greater than the diameter of the stem 52, its diameter being measured in a direction that is transverse to the longitudinal direction.

As can be seen in the figures, and more particularly in FIGS. 13d and 13h, when seen from above the hook, each of the ribs 81 and 82 presents a generally upside down V-shape (or U-shape or C-shape) having two branches forming an angle, which angle typically lies in the range 90° to 180°, or more precisely in the range 110° to 170°, or indeed in the range 140° to 150°, or is substantially equal to 145°. The two branches of the generally V-shaped rib thus converge towards the front of the hook. This embodiment is purely illustrative, and the generally V-shaped shape may be inverted, such that the rib converges towards the rear of the hook, e.g. by modifying the speed parameters of the forming device 7. The tip of the upside down V-shape, or where appropriate, of the U-shape or of the C-shape, may point towards the front in the longitudinal direction.

Typically, the ribs 81 and 82 are symmetrical about a plane extending in a longitudinal direction of the base 51 and containing a central axis of the stem 52 of the retaining elements.

The hooks as formed in this way typically have a height lying in the range 5 μm to 5000 μm, or indeed in the range 5 μm to 2000 μm, or more particularly in the range 20 μm to 800 μm, or still more particularly in the range 100 μm to 500 μm, with the height being measured in a direction perpendicular to the top face 511 of the base 51.

The head 53 may be heated prior to the forming step so that it is at a temperature lying between the heat deflection temperature of the molding material and the melting temperature of the molding material, and the forming device 7 may include a rotary element at a temperature that is less than the heat deflection temperature of the molding material, for example.

As can be seen in particular in FIGS. 13f, 13g, and 13j, the hook presents a substantially plane sloping region on the face of the head that is arranged at the rear of the hook (relative to the travel direction of the molding strip 1).

Another aspect of the device as described relates to the regularity of the tape produced in this way.

Injecting molding material by using the material dispenser means 3 makes it possible to obtain a tape having edges in the longitudinal direction that are substantially straight immediately on making the tape, and without requiring an additional cutting step.

Figure 14:
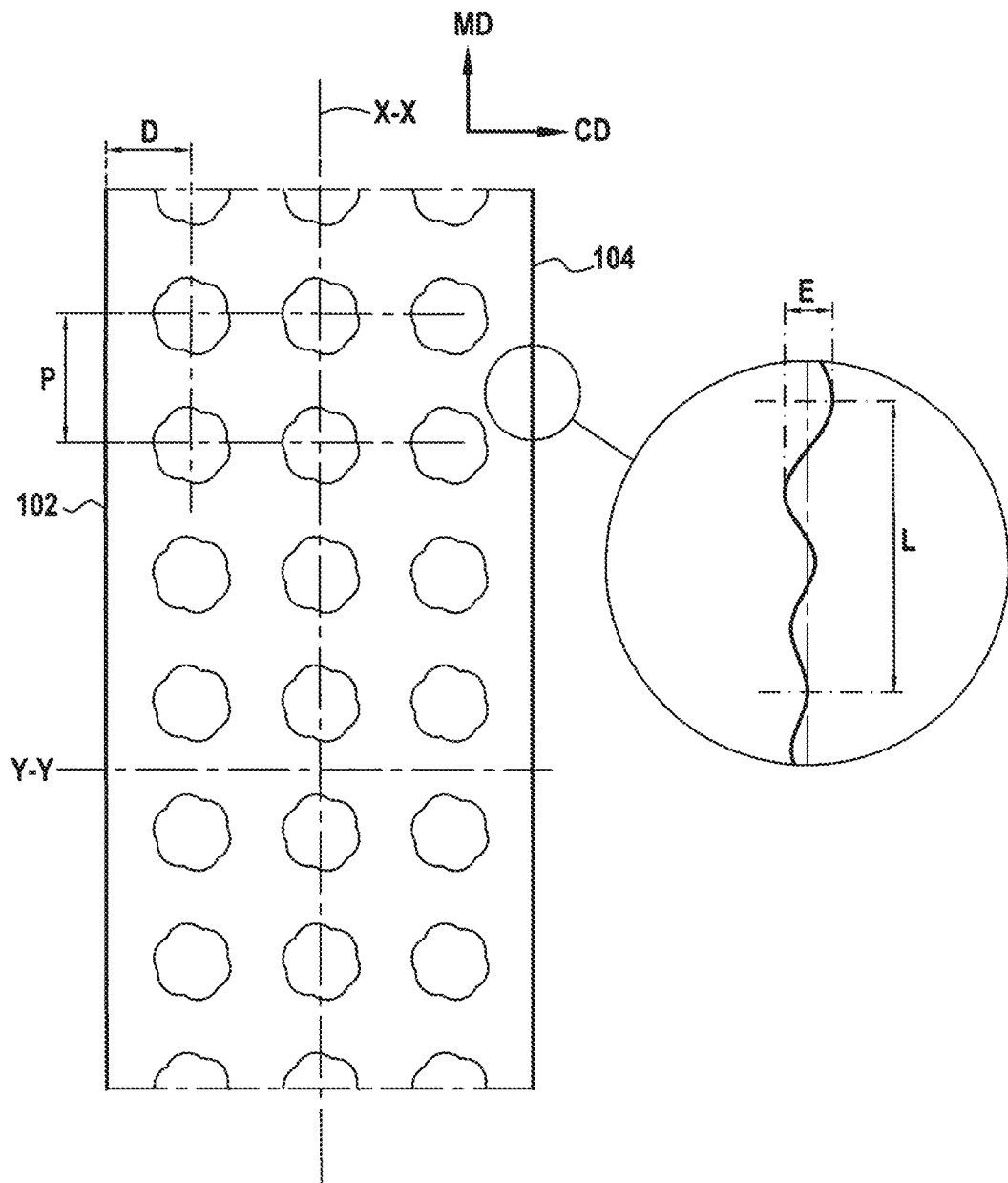
FIG. 14 is a plan view of the tape obtained in this way, showing the properties of the margins of the tape.

FIG. 14 is a diagram showing the tape 100 as described above when seen from above, which tape comprises a base together with preforms or hooks. In the example shown in FIG. 14, the tape 100 is shown as being provided with preforms as described above, in particular with reference to FIGS. 7 to 10.

This figure is a diagram of the tape 100 obtained as a result of injecting material into the molding strip 1, the tape thus extending in a longitudinal direction as identified by an axis X-X in FIG. 14. FIG. 14 also shows the transverse direction, identified by an axis Y-Y. The longitudinal direction identified by the axis X-X in this example is parallel to the machine direction, i.e. to the direction in which the tape 100 is driven.

Two edges 102 and 104 are defined for this tape 100, each edge extending along the longitudinal direction, these two edges 102 and 104 defining the two ends of the tape 100 in a transverse direction perpendicular to the longitudinal direction.

The hooks or preforms are generally arranged in the proximity of the edges 102 and 104. The hooks or preforms are typically arranged at a distance D from the edges 102 and 104 lying in the range 2 to 3 times the pitch P of the hooks, typically equal to 2 or 3 times the pitch P of the hooks, the distance D being measured along the transverse direction relative to the longitudinal direction represented by the axis X-X in FIG. 14. The pitch P between two hooks corresponds to the distance between two successive hooks along the longitudinal direction. In the example shown in FIG. 14, the hooks or preforms are arranged in columns extending in the longitudinal direction represented by the axis X-X, these columns being repeated identically in the transverse direction. The hooks or preforms could equally well be arranged in a staggered or "honeycomb" configuration, e.g. by offsetting the columns of hooks or preforms in the longitudinal direction.

As shown in FIG. 14, each of the edges 102 and 104 presents a succession of highs and lows, said succession extending in the longitudinal direction, and said highs and lows extending in a plane parallel to the plane formed by the base 51, the highs and lows representing small irregularities in the distribution of molding material for forming the tape 100, it being understood that an edge that is accurately rectilinear cannot be made industrially.

The lows should be understood as regions of the edges 102 and 104 that are indented towards the inside of the tape 100, while the highs should be understood as being regions of the edges 102 and 104 that bulge towards the outside of the tape 100.

The regularity of the edges 102 and 104 can thus be evaluated using the successive highs and lows.

In section view on a direction transverse to the longitudinal direction, the edges 102 and 104 present portions of rounded shape. More particularly, the rounded shape is oriented laterally towards the outside of the base. This rounded shape is made while forming the base. In other words, this rounded shape is not obtained by cutting.

The apparatus and the method as described above make it possible to obtain edges 102 and 104 of the tape such that for a length L along the longitudinal direction corresponding to three consecutive highs, the maximum offset E between the highs and lows in a direction transverse to the longitudinal direction is less than 3.0 mm, or more precisely less than 2.0 mm, or indeed more precisely less than 1.0 mm, or indeed lying in the range 0.001 mm to 1.0 mm, more particularly in the range 0.001 mm to 0.5 mm, still more particularly in the range 0.001 mm to 0.1 mm.

Such a definition is equally applicable to a length corresponding to three consecutive lows; the maximum offset between the highs and lows in a direction transverse to the longitudinal direction is less than 3.0 mm, or more precisely less than 2.0 mm, or indeed more precisely less than 1.0 mm, or indeed lies in the range 0.001 mm to 1.0 mm, more particularly in the range 0.001 mm to 0.5 mm, still more particularly in the range 0.001 mm to 0.1 mm.

The three consecutive highs or lows lie typically over a distance that is less than the distance corresponding to 15 times the hook pitch, preferably less than a distance of 25 mm.

Obtaining edges 102 and 104 that can thus be said to be "straight" is advantageous in that it makes it possible to avoid a subsequent step of straightening the edges, e.g. by using a cutting step, where such straight edges are perceived by the user as being a sign that the product is of good quality.

Furthermore, the apparatus and the method used make it possible to obtain such edges that are straight without requiring any longitudinal extra thicknesses in the margins of the tape, where such extra thicknesses do not present any functional advantage. The base 51 of the tape 100 may thus be free from any extra thickness extending continuously along its edges, and typically presents a thickness that is substantially constant from one edge to the other. More generally, it can be understood that the base 51 of the tape may be free from any non-functional extra thickness (where the only function would be to improve the regularity of the margins of the tape), which is advantageous in production terms in so far as extra thicknesses would lead to overconsumption of material and would increase the length of time the molds are occupied.

As can be understood from the above description, the straight edges are obtained by injecting the molding material via the material dispenser means 3. The subsequent steps of unmolding and of forming conserve the straight edges as described above, in so far as the steps do not involve applying forces to the edges of the base 51 of the tape 100. The tape 100 as obtained in this way after those various steps thus presents an edge that is straight, as defined above.

Furthermore, when at least two distinct materials are dispensed simultaneously or successively by the material dispenser means 3, the interface between the two materials is then typically made so as to present a straight boundary, as described above with reference to the edges of the base 51 of the tape 100. More precisely, when two materials are dispensed simultaneously or in succession, each material is injected by the material dispenser means 3 in such a manner as to form straight edges at both of the transverse ends of the tape of material formed in this way. Consequently, the junctions between the two materials are junctions between two straight edges as defined above, and thus each of them presents a profile that can be said to be "straight" in accordance with the above definition. By way of example, the dispenser means may comprise two injection or extrusion nozzles.

The above described apparatus and the associated method may also present means and a step for associating a substrate with the tape.

Such association of a substrate with a tape having gripper elements is typically performed by means of an adhesive, or by melting the base or the substrate, as mentioned above.

In order to secure a substrate to the base of the tape, the proposed apparatus may include substrate drive means adapted to feed substrate and to apply the substrate against the bottom face 512 of the base 51 of the tape 100 downstream from the material dispenser means 3.

Figure 16:
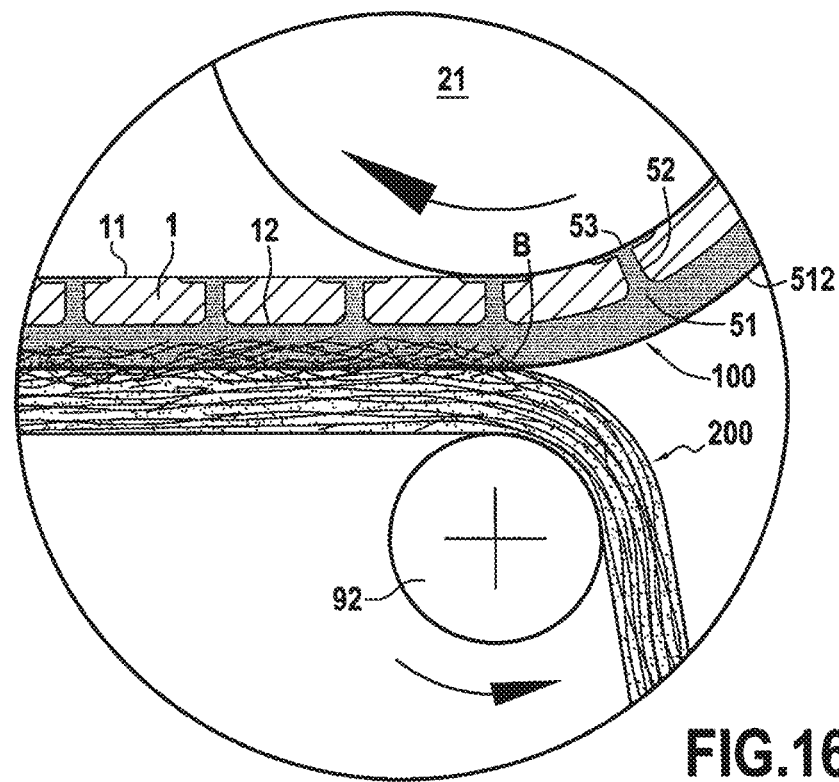

FIGS. 15 and 16 are diagrams showing an example of apparatus including such means.

The apparatus as shown is similar to that described above with reference to FIG. 1; elements in common are therefore not described again.

As can be seen in FIGS. 15 and 16, the apparatus as described has substrate drive means 9, constituted in this example by two rollers 91 and 92, which rollers are configured to feed substrate 200 downstream from the material dispenser means 3.

The substrate 200 is typically a layer of nonwoven material, a plastics film, an elastic film, or a composite film, or indeed an assembly of thermo-consolidated fibers and/or filaments. By way of example the substrate 200 is a sheet of fibers and/or filaments.

In the example shown in FIGS. 15 and 16, the substrate is shown as being a layer of nonwoven material.

The term "nonwoven" material is used to designate a product obtained as a result of forming a sheet of fibers and/or filaments that have been consolidated. Consolidation may be mechanical, chemical, or thermal, and it gives rise to bonds being present between the fibers and/or the filaments. Such consolidation may be direct, i.e. performed directly between the fibers and/or the filaments, by welding, or it may be indirect, i.e. via an intermediate layer between the fibers and/or the filaments, e.g. a layer of adhesive or a layer of binder. The term "nonwoven" material relates to a structure in the form of a tape or sheet of fibers and/or filaments that are interleaved in a manner that is not uniform, i.e. irregular, or at random. A nonwoven material may have a single-layer structure or a structure made up of multiple layers. A nonwoven material may also be combined with some other material in order to form a laminate. A nonwoven material may be made from various synthetic and/or natural materials. By way of example, natural materials comprise cellulose fibers, such as cotton, jute, flax, and the like, and may also include cellulose fibers that have been reprocessed, such as rayon or viscose. Natural fibers for a nonwoven material may be prepared by using various methods such as carding. By way of example, synthetic materials comprise, but without being limited thereto, synthetic thermoplastic polymers known for forming fibers that include, without being limited thereto, polyolefins, e.g. polyethylene, polypropylene, polybutylene, or the like; polyamides, e.g. polyamide 6, polyamide 6.6, polyamide 10, polyamide 12, and the like; polyesters, e.g. polyethylene terephthalates, polybutylene terephthalates, polylactic acids, and the like, polycarbonates, polystyrenes, thermoplastic elastomers, vinyl polymers, polyurethanes, and mixtures and copolymers thereof. By way of example, the nonwoven material may be a material of the type: Spunbond, Spunmelt, melted carded, SMS, SMMS, SS, SSS, SSMMS, SSMMMS, Air through, etc.

The substrate is not limited to a nonwoven material, and could more generally be a nonwoven material, a woven material, a knitted material, or a combination of a plurality of these materials.

The substrate drive means 9 are configured to feed the apparatus with substrate 200 and to apply the substrate 200 against the bottom face 512 of the base 51 of the tape 100 downstream from the material dispenser means 3.

The substrate drive means 9 are configured in such a manner that this application takes place prior to the base 51 of the tape 100 solidifying. Thus, this application causes at least part of the substrate 200 to penetrate beyond a plane defined by the bottom face 512 of the base 51 of the tape 100. In the figures, reference B designates the point where the base 51 of the tape 100 is put into contact with the substrate 200.

Figure 17:
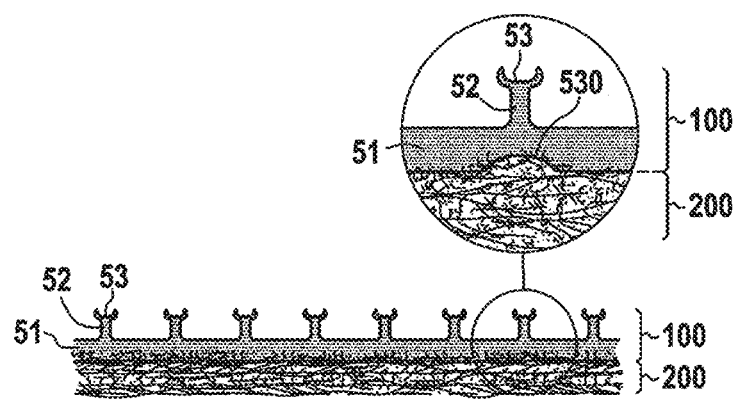
FIG. 17 is a diagram showing an example of the product obtained using such apparatus.

More precisely, the bottom face 512 of the base 51 is substantially plane, and it defines a plane. Applying the substrate against this face causes portions of the substrate 200, e.g. fibers and/or filaments of the layer of nonwoven material when the substrate 200 is a layer of nonwoven material, to penetrate into the base 51, thus passing through the bottom face 512 of the base 51. FIG. 17 is thus a diagram showing an example of a product that results from this bonding between the tape 100 and the substrate 200.

In so far as such application takes place before the base 51 of the tape 100 has solidified, there is no need to heat the base 51 of the tape 100 and/or the substrate 200 in order to achieve such bonding.

By way of example, assuming that the base 51 is made of polypropylene, the substrate is typically applied against the bottom face 512 of the base 51 while the bottom face 512 of the base 51 presents a temperature lying between the melting temperature and the Vicat B softening temperature of the material constituting it minus 30° C., or indeed between the melting temperature of the material constituting it and the Vicat A softening temperature of the material constituting it. More particularly, when the base comprises material based on polypropylene, the bottom face 512 of the base 51 presents a temperature lying in the range 75° C. to 150° C., typically about 105° C., this temperature typically being measured by means of an infrared camera or a laser. The Vicat softening temperature is the temperature obtained using one of the methods described in the ISO 306 or the ASTM D 1525 standards while heating at a rate of 50° C. per hour (° C./h) and with a standardised load of 50 newtons (N) for Vicat B and a standardised load of 10 N for Vicat A.

More generally, while the substrate 200 is being applied against the bottom face 512 of the base 51, the bottom face 512 of the base 51 is at a temperature lower than its melting temperature, or more particularly lower than the heat deflection temperature of the material forming the base 51, or indeed substantially equal to ambient temperature (or to a non-regulated temperature), and the temperature of the base 51 results solely from the step of forming the tape 100. With reference to above-defined points A, B, and C, and as can be seen in particular in FIG. 15, the distance travelled by the base 51 between the points A and B typically lies in the range 20.0 mm to 400 mm. Likewise, the distance travelled by the base 51 between the points B and C typically lies in the range 400 mm to 1500 mm. The distance travelled by the base 51 between the points B and C is typically twice as long as the distance travelled by the base 51 between the points A and B.

The roller 92 is typically configured so as to apply the substrate 200 with pressure against the bottom face 512 of the base 51 so as to facilitate penetration of the substrate 200 to the base 51.

The roller 92 may present patterns or portions in relief on its surface, so as to enhance penetration of the substrate 200 into the base 51.

The substrate 200 may be applied in uniform or non-uniform manner against the bottom face 512 of the substrate 51.

The bonding achieved between the substrate 200 and the base 51 of the tape 100 may be uniform or non-uniform.

When the substrate 200 is a set of thermally consolidated fibers and/or filaments, the bonding with the base 51 is also achieved by a fraction of the fibers and/or filaments of the substrate 200 penetrating into the base.

When the substrate 200 is a set of thermally consolidated fibers and/or filaments, a plastics film, an elastic film, or a composite film, a phenomenon might occur during bonding with the base whereby the tape 100 shrinks during cooling, this shrinking enhancing the bonding area between the substrate and the base of the tape. This shrinking is of no impact on the visual appearance for the final user.

More precisely, it is well known that molded parts present a shrinkage phenomenon during cooling of the material. In the present example, the tape 100 presents portions of different thicknesses as a result of the presence of the retaining elements projecting from the top face 511 of the base 51. Such zones presenting extra thickness lead to phenomena of the material shrinking in register with the stems 52 of the hooks, thus forming zones 530 of material shrinkage in the bottom face 512 of the base 51.

However, in so far as the substrate 200 is applied against the bottom face 512 of the base 51 prior to solidification of the base 51, this shrinkage of material takes place after the substrate has been applied against the bottom face 512 of the base 51.

Pressing the substrate 200 against the bottom face 512 of the base 51 in association with the fact that the base 51 has not yet solidified during this application leads to bonding by molecular diffusion between the substrate 200 and against the bottom face 512 of the base 51. Thus, during shrinkage of the material of the base 51 as it solidifies, as mentioned above, the substrate 200 remains in contact with the bottom face 512 of the base 51, and regions of the film forming the substrate 200 thus continue to fit closely to the shape of the material shrinkage zones in the bottom face 512 of the base 51. These regions of the film forming the substrate 200 thus penetrate beyond the plane defined by the bottom face 512 of the base 51. Thus, the surface area of the film forming the substrate 200 in contact with the bottom face 512 of the base 51 is greater than the projection of the surface area of the film onto a plane defined by the bottom face 512 of the base 51, thus making it possible to increase adhesion between the substrate 200 and the tape 100.

When the substrate 200 is a layer of nonwoven material, the hooks are unmolded easily, even with a nonwoven material presenting a weight of less than 80 g/m2. By way of example, the weight of the nonwoven material may lie in the range 5 g/m2 to 120 g/m2, or indeed in the range 10 g/m2 to 70 g/m2.

When the substrate 200 is a layer of nonwoven material, the apparatus may include a calendering device upstream from the substrate drive means 9, thus making it possible (optionally locally) to perform a calendering step on the layer of nonwoven material prior to applying it against the tape 100.

This technique for bonding the substrate 200 to a tape 100 is advantageous, in particular in that it does not lead to the tape 100 becoming deformed, and thus advantageously makes it possible to conserve the shape of the base 51 as obtained during the injection step, and in particular to conserve the straight edges that can be obtained using the above-described method and apparatus.

This bonding of a substrate to a tape can be applied to a method of forming a tape as described above, or more generally to any other method of forming a tape that includes retaining elements such as hooks.

The various above-described apparatuses and methods may be used independently or in combination.

Figure 18:
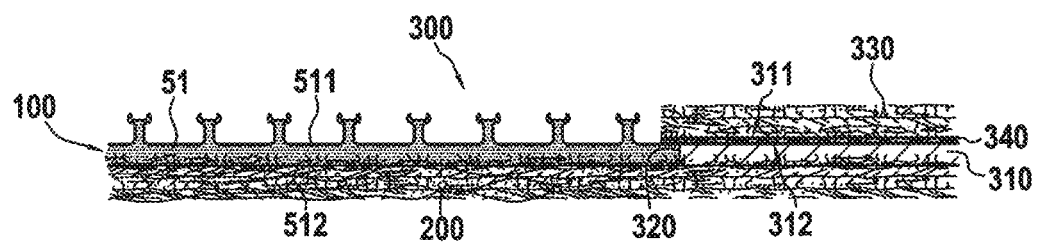
FIG. 18 is a diagram showing another example of a product that can be obtained using the above-described apparatuses.

By way of example, there follows a description with reference to FIG. 18 of a product that can be obtained using the above-described apparatuses and methods.

FIG. 18 thus shows a product 300 comprising a tape 100 made out of a plastics material, the tape 100 being formed integrally with a film of elastic material 310 by extrusion. More particularly, the tape 100 made of plastics material is formed integrally with an elastic material film 310 by extrusion operations that may be simultaneous or in succession. The term "extrusion operations in succession" is used herein to mean that the film 310 and/or the tape 300 is made continuously with the formation of the tape 300 and/or of the film 310, or indeed on a single production line.

FIG. 18 is a section view on a plane perpendicular to the longitudinal direction of the product 300 being formed.

The tape 100 is similar to the tape as described above, and it comprises a base 51 and hooks extending from the top face 511 of the base 51.

The film of elastic material 310 is extruded simultaneously, successively, or prior to extruding the tape 100 by the material dispenser means 3, thereby defining a bond between the tape 100 and the film 310 at one of their transverse ends. The transition between the elastic film 310 and the base 51 of the tank 100 is thus typically continuous.

Thus, the film of elastic material 310, the base, and the retaining elements of the tape 100 made of plastics material are made integrally and are the result of extrusion.

Numerical reference 320 designates the interface between the film of elastic material 310 and the tape 100.

The term "integrally" is used to mean that the tape and the film are bonded together solely by simultaneous or successive distributions of material, e.g. by simultaneous or successive extrusion operations. In other words, the resulting bonding is achieved solely by intramolecular diffusion from the tape to the elastic film and/or from the elastic film to the tape.

This interface 320 may be made in a plane that is substantially parallel to the longitudinal direction of the product 300, as shown in FIG. 18, or it may be made by overlap between the elastic film 310 and the tape 100.

When the hooks and the base are made out of the same material, it can be seen that there is continuity of material from the base towards the hooks, and vice versa. In other words, the material forming the hooks and the material forming the base are contiguous.

The elastic film 310 is defined as having a top face 311 and a bottom face 312. In the example shown in the figure, the top face 311 of the elastic film 310 in this example extends the top face 511 of the base 51 of the tape 100. In the example shown in FIG. 18, the bottom face 312 of the elastic film 310 in this example extends the bottom face 512 of the base 51 of the tape 100.

The assembly formed by the elastic film 310 and by the tape 100 thus constitutes an intermediate layer, presenting a bottom face and a top face.

As can be seen in FIG. 18, a substrate 200 is secured to the bottom face of the intermediate layer, i.e. to the bottom face 312 of the elastic film 310 and to the bottom face 512 of the base 51 of the tape 100

The substrate 200 may for example be a nonwoven material, as described above.

The substrate 200 is secured to the intermediate layer by partial encapsulation in said intermediate layer, i.e. by partial encapsulation of the substrate in the base 51 of the tape 100 and in the elastic film 310. This bonding is performed using the method and the apparatus as described above with reference to FIGS. 15 to 17.

The product 300 as shown also has a support layer 330 secured to the top face of the intermediate layer. This support 330 extends over the top face 311 of the elastic film 310, and also at least in part over the top face 511 of the base 51 of the tape 100.

The support layer 330 may be identical in composition to the substrate 200, or it may have a different composition; for example, it may be a layer of nonwoven material, a knit, or a grid.

In the example shown, the support layer 330 is secured on the top face of the intermediate layer by adhesive. FIG. 18 is thus a diagram showing a layer of adhesive 340 extending over the top face 311 of the elastic film 310, and also at least in part over the top face 511 of the base 51 of the tape 100.

The support layer 330 is then typically secured to the top face of the intermediate layer after securing the substrate 200 to the bottom face of the intermediate layer.

It can readily be understood that securing in this way is merely illustrative, and that any other suitable method may be used for securing the support layer 330 on the top face of the intermediate layer.

By way of example, the support layer 330 may be arranged on the molding strip 1 prior to the material dispensing means 3 dispensing material, such that the plastic and elastic material materials are injected onto the molding strip while the support layer 330 is positioned on the molding strip 1, as mentioned above.

The top face and/or the bottom face of the base 51 of the tape 100 and/or of the elastic film 310 may optionally be smooth (with the exception of the hooks). By way of example they may present elements in relief, e.g. transition elements, hooks that have been eliminated, recesses such as holes or slots, or projections such as spikes, points, domes, and/or pins. These elements in relief may present a height that is smaller than the height of the retaining elements, more particularly less than 40% of the height of retaining elements, in particular less than 25% of the height of the retaining elements. Such elements in relief can be advantageous in certain applications, e.g. in order to define zones of distinct roughness or of different surface appearance providing advantages that may be practical and/or aesthetic.

When the substrate 200 and/or the support layer 330 is a nonwoven material, the substrate 200 and/or the support 330 may be activated prior to being secured to the intermediate layer, as mentioned above.

The term "plastics material" is used to mean a thermoplastic material, more particularly a polyolefin material based on a homopolymer or a copolymer.

By way of example, a plastics material from the following list: linear low density polyethylene (LLDPE), low density polyethylene (LDPE), metallocene polyethylene (m-PE), high-density polyethylene (HDPE), ethylene vinyl acetate (EVA), and polypropylene (PP), having a molecular weight distribution that is monomodal or multimodal (e.g. bimodal), in particular a composition comprising LLDPE and a plastomer, in particular a plastomer based on polyethylene. It is also possible to use polyimide (PA), polylactic acid (PLA), polyhydroxyalkanoates (PHA), polyvinyl alcohols (PVOH), polybutadiene styrene (PBS).

The term "elastic material" is used to mean a material suitable for being stretched under the effect of a stretching force exerted in the lateral direction and then for returning substantially to its initial shape and dimensions after said stretching force has been released. By way of example it may be a material that conserves residual deformation or remanence after elongation and release (where such residual deformation is also referred to as "permanent set" or "set") that is less than 30%, or indeed less than 20%, e.g. less than 5%, of its initial dimension (prior to elongation) after being lengthened by 100% of its initial dimension, and at ambient temperature (23° C.). Set can be measured as described in patent application EP 1 783 257, the content of which is incorporated by reference, and in particular the paragraphs [0056] to [0062] of the publication EP 1 783 257 A1 which describe in detail an example of measuring set.

As examples of elastic materials, mention may be made of: styrene/isoprene copolymers (SI), styrene/isoprene/styrene (SIS), styrene/butadiene/styrene (SBS), styrene-ethylene/butylene-styrene (SEBS), styrene-ethylene/propylene-styrene (SEPS), or styrene isoprene butadiene (SIBS). It is also possible to take account of mixtures of these elastomers with one another or with non-elastomers that modify certain characteristics other than elasticity. For example, up to 50% by weight, but preferably less than 30% by weight of polymer may be added in order to modify certain characteristics of the base materials (elasticity, high-temperature behavior, processability, resistance to ultraviolet (UV) radiation, . . . ), polyvinyl styrenes, polystyrenes or poly a-methyl styrenes, epoxy polyesters, polyolefins, e.g. polyethylenes or certain ethylene/vinyl acetates, preferably those of high molecular weight.

In particular, the elastic material may be a styrene-isoprene-styrene, e.g. available from the supplier Kraton Polymers, under the name KRATON D (registered trademark), or from the supplier DEXCO POLYMERS LP under the name VECTOR SBC 4211 (registered trademark). It is also possible to use thermoplastic elastomer (TPE) materials in particular a thermoplastic elastomer of polyurethane, in particular PELLETHANE (registered trademark) 2102-75A from the supplier The Dow Chemical Company. It is also possible to use a styrene-butadiene-styrene, in particular KRATON D-2122 (registered trademark) from the supplier Kraton Polymers, or VECTOR SBC 4461 (registered trademark) from the supplier Dexco Polymers LP. It is also possible to use a styrene-ethylene/butylene, in particular KRATON G-2832 (registered trademark) from the supplier Kraton Polymers, or a sequenced styrene-ethylene-butylene-styrene copolymer (SEBS), in particular KRATON (registered trademark) G2703. It is also possible to use a copolymer of isooctyl acrylate and of acrylic acid with a monomer ratio of 90/10. It is also possible to use a sequenced polyimide polyester copolymer PEBAX (registered trademark) 2533 from the supplier Arkema.

Other possible materials are polyolefins polymers, mainly copolymers of ethylene and/or propylene having the characteristics of elastomers, in particular obtained by metallocene catalysis, such as VISTAMAXX VM-1120 (registered trademark), available from the supplier Exxon Mobil Chemical or indeed rubber-filled polymers such as for example Santoprène filled with EPDM.

It is also possible to use materials to enhance bonding between the plastics material and the elastic material. In a variant embodiment, it is possible to envisage that each of the cavities in the molding strip includes a stem that extends between the top face and the bottom face of the molding strip, from one of its faces to the other.

Various systems and methods compatible with the present disclosure are described in patent applications FR16/53866, FR16/53870, FR16/53872, FR16/53873, FR16/53888, FR16/53894, and FR16/53897, which are incorporated in full by reference in this description.

The invention claimed is:

1. A retaining device comprising:
   a base extending in a longitudinal direction and presenting a top face and a bottom face;
   a plurality of retaining elements extending from the top face of the base, each of the retaining elements being formed by a stem surmounted by a head, the stem having a bottom end connected to the base, and a top end opposite from the bottom end, the head surmounting the top end of the stem, and having a bottom face facing towards the base and a top face opposite from the bottom face;

the base presenting a thickness lying in the range 10 µm to 700 µm, where the thickness is the distance between the top face and the bottom face; and the top face of the head of each retaining element including a rib;

the device being characterized in that the head of each retaining element includes at least one catch portion extending radially relative to the top end of the stem, said at least one catch portion including a rib which extends on the top end of the stem, over the at least one catch portion, wherein the at least one catch portion has a width and a length, and the rib has a width and a length, wherein the length of the rib is greater than the width of the rib, the respective widths of the at least one catch portion and the rib each being measured with respect to the longitudinal direction, the respective lengths of the at least one catch portion and the rib each being length being measured with respect to a transverse direction that is orthogonal to the longitudinal direction, the width of the at least one catch portion being greater than the width of the rib, and wherein the longitudinal direction and the transverse direction are orthogonal to a vertical direction extending from the bottom end of the stem toward the top end of the stem.

2. A retaining device according to claim 1, wherein the head of each retaining element includes two catch portions extending radially relative to the top end of the stem, each of said catch portions including a rib, said catch portions extending on either side of the stem.

3. A retaining device according to claim 2, wherein the head includes a rib extending continuously between the two catch portions.

4. A retaining device according to claim 1, wherein the head further includes a transverse rib extending between two opposite ends on either side of an axis extending along the longitudinal direction, the transverse rib extending over the top end of the stem.

5. A retaining device according to claim 1, wherein the at least one catch portion has a free end that slopes towards the base.

6. A retaining device according to claim 1, wherein the top face of the head of each retaining element has two distinct ribs extending at least in part over the same catch portion.

7. A retaining device according to claim 6, wherein for each retaining element, each of the ribs extends over a fraction only of the periphery of the head, in particular the combined length of the ribs of a retaining element under consideration lies in the range 5% to 95% of the length of the periphery of the head of the retaining element under consideration.

8. A retaining device according to claim 1, wherein said base has two edges in the longitudinal direction, and wherein each of said edges presents highs and lows, the maximum offset between the highs and the lows along a direction transverse to the longitudinal direction being less than 1 mm over a length in the longitudinal direction that corresponds to three consecutive highs.

9. A retaining device according to claim 1, wherein the width of the base lies in the range 1 mm to 500 mm.

10. A retaining device according to claim 1, wherein the retaining elements have a height lying in the range 5 µm to 5000 µm, with height being measured in a direction perpendicular to the top face of the base.

11. A retaining device according to claim 1, wherein the stem of each retaining element presents symmetry of rotation about an axis perpendicular to the top face of the base.

12. A retaining device according to claim 1, wherein each rib of the head extends in a direction that is substantially transverse to said longitudinal direction of the base.

13. A retaining device according to claim 1, wherein the retaining elements present a shape that is asymmetrical relative to a plane that is transverse to the longitudinal direction of the base.

14. A retaining device according to claim 1, wherein each retaining element presents symmetry relative to a plane extending in a longitudinal direction of the base and containing the axis of the stem of the retaining element.

15. A retaining device according to claim 1, wherein each catch portion extends in a direction substantially perpendicular to the longitudinal direction of the base.

16. A retaining device according to claim 1, wherein each rib presents a V-shape in which the angle between the two branches of the V-shape lies in the range 90° to 180.

17. A retaining device according to claim 1, wherein the length of at least one rib in a direction transverse to the longitudinal direction of the base is greater than the diameter of the stem in a direction perpendicular to the longitudinal direction of the base.

18. A retaining device according to claim 1, wherein the rib is a first rib and the at least one catch portion includes a first catch portion and a second catch portion, the first rib extending over the first catch portion and the second catch portion, and wherein the retaining device further includes a second rib that extends over at least one of the first catch portion and the second catch portion.

19. A retaining device comprising:
a base extending in a longitudinal direction and presenting a top face and a bottom face;
a plurality of retaining elements extending from the top face of the base, each of the retaining elements being formed by a stem surmounted by a head, the stem having a bottom end connected to the base, and a top end opposite from the bottom end, the head surmounting the top end of the stem, and having a bottom face facing towards the base and a top face opposite from the bottom face;
the base presenting a thickness lying in the range 10 µm to 700 µm, where the thickness is the distance between the top face and the bottom face; and
the top face of the head of each retaining element including a rib;
the device being characterized in that the head of each retaining element includes at least one catch portion extending radially relative to the top end of the stem, said at least one catch portion including a rib which extends on the top end of the stem, over the at least one catch portion,
wherein the head further includes a transverse rib extending between two opposite ends on either side of an axis extending along the longitudinal direction, the transverse rib extending over the top end of the stem.

20. A retaining device comprising:
a base extending in a longitudinal direction and presenting a top face and a bottom face;
a plurality of retaining elements extending from the top face of the base, each of the retaining elements being formed by a stem surmounted by a head, the stem having a bottom end connected to the base, and a top end opposite from the bottom end, the head surmounting the top end of the stem, and having a bottom face facing towards the base and a top face opposite from the bottom face;

the base presenting a thickness lying in the range 10 µm to 700 µm, where the thickness is the distance between the top face and the bottom face; and the top face of the head of each retaining element including a rib;

the device being characterized in that the head of each retaining element includes at least one catch portion extending radially relative to the top end of the stem, said at least one catch portion including a rib which extends on the top end of the stem, over the at least one catch portion, wherein the length of at least one rib in a direction transverse to the longitudinal direction of the base is greater than the diameter of the stem in a direction perpendicular to the longitudinal direction of the base.

* * * * *